United States Patent
Lee et al.

(10) Patent No.: US 12,490,189 B2
(45) Date of Patent: Dec. 2, 2025

(54) METHOD AND APPARATUS FOR POWER SAVING IN SIDELINK COMMUNICATION

(71) Applicant: ELECTRONICS AND TELECOMMUNICATIONS RESEARCH INSTITUTE, Daejeon (KR)

(72) Inventors: Jung Hoon Lee, Daejeon (KR); Cheul Soon Kim, Daejeon (KR); Sung Hyun Moon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 514 days.

(21) Appl. No.: 17/470,683

(22) Filed: Sep. 9, 2021

(65) Prior Publication Data

US 2022/0104126 A1 Mar. 31, 2022

(30) Foreign Application Priority Data

| Sep. 29, 2020 | (KR) | 10-2020-0127565 |
| Jan. 27, 2021 | (KR) | 10-2021-0011817 |
| Apr. 1, 2021 | (KR) | 10-2021-0042893 |
| Apr. 5, 2021 | (KR) | 10-2021-0044288 |
| Sep. 1, 2021 | (KR) | 10-2021-0116210 |

(51) Int. Cl.
*H04W 52/02* (2009.01)
*H04W 92/18* (2009.01)
*H04W 72/25* (2023.01)

(52) U.S. Cl.
CPC ........ *H04W 52/0219* (2013.01); *H04W 92/18* (2013.01)

(58) Field of Classification Search
CPC .. H04W 52/0219; H04W 92/18; H04W 72/25
See application file for complete search history.

(56) References Cited

U.S. PATENT DOCUMENTS

| 2019/0037495 A1 | 1/2019 | John Wilson et al. |
| 2020/0015272 A1* | 1/2020 | Lee .................... H04W 72/121 |
| 2020/0229189 A1 | 7/2020 | Kwak et al. |
| 2020/0259627 A1 | 8/2020 | Loehr et al. |
| 2020/0328864 A1 | 10/2020 | Choi et al. |
| 2020/0328865 A1 | 10/2020 | Choi et al. |
| 2020/0337110 A1 | 10/2020 | Kim |

(Continued)

FOREIGN PATENT DOCUMENTS

| WO | 2017/213687 A1 | 12/2017 | |
| WO | 2020/251237 A1 | 12/2020 | |
| WO | WO-2021163460 A1 * | 8/2021 | ........ H04W 52/0225 |

*Primary Examiner* — Jinsong Hu
*Assistant Examiner* — Farideh Madani
(74) *Attorney, Agent, or Firm* — LRK PATENT LAW FIRM

(57) ABSTRACT

An operation method of a first terminal in a communication system may include: receiving, from a base station, configuration information including information of n periodicities; selecting one or more periodicities among the n periodicities; performing a partial sensing operation by using the one or more periodicities; and performing sidelink communication with a second terminal based on a result of the partial sensing operation, wherein n is a natural number equal to or greater than 2.

7 Claims, 18 Drawing Sheets

(56) References Cited

U.S. PATENT DOCUMENTS

| | | | |
|---|---|---|---|
| 2023/0050353 A1* | 2/2023 | Miao | H04W 74/0808 |
| 2023/0066041 A1* | 3/2023 | Guo | H04W 52/0216 |
| 2023/0074305 A1* | 3/2023 | Liu | H04W 72/25 |

* cited by examiner

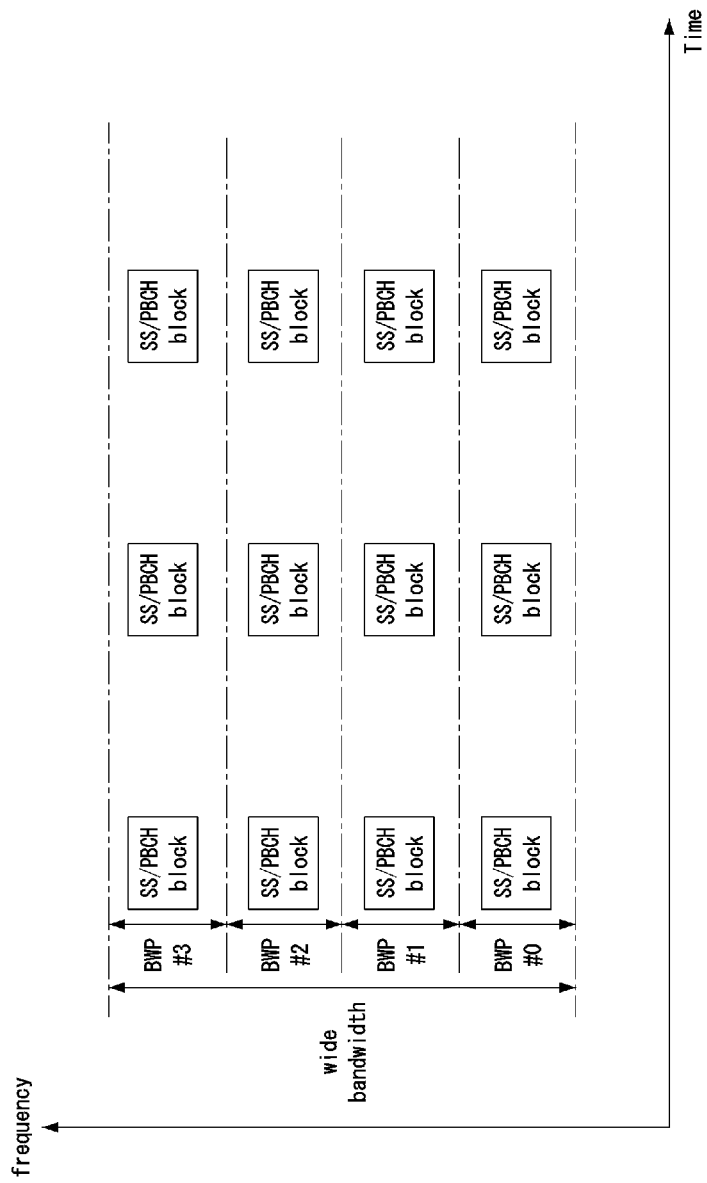

RMSI CORESET mapping pattern #1

RMSI CORESET mapping pattern #2

RMSI CORESET mapping pattern #3

METHOD AND APPARATUS FOR POWER SAVING IN SIDELINK COMMUNICATION

CROSS-REFERENCE TO RELATED APPLICATIONS

This application claims priority to Korean Patent Applications No. 10-2020-0127565 filed on Sep. 29, 2020, No. 10-2021-0011817 filed on Jan. 27, 2021, No. 10-2021-0042893 filed on Apr. 1, 2021, No. 10-2021-0044288 filed on Apr. 5, 2021, and No. 10-2021-0116210 filed on Sep. 1, 2021 with the Korean Intellectual Property Office (KIPO), the entire contents of which are hereby incorporated by reference.

BACKGROUND

1. Technical Field

The present disclosure relates to a sidelink communication technique in a communication system, and more particularly, to a technique for power saving in sidelink communication.

2. Description of Related Art

The communication system (e.g., a new radio (NR) communication system) using a higher frequency band (e.g., a frequency band of 6 GHz or above) than a frequency band (e.g., a frequency band of 6 GHz or below) of the long term evolution (LTE) communication system (or, LTE-A communication system) is being considered for processing of soaring wireless data. The NR system may support not only a frequency band of 6 GHz or below, but also a frequency band of 6 GHz or above, and may support various communication services and scenarios compared to the LTE system. In addition, requirements of the NR system may include enhanced Mobile BroadBand (eMBB), Ultra Reliable Low Latency Communication (URLLC), and Massive Machine Type Communication (mMTC).

A terminal may select resources by performing a partial sensing operation and/or a random selection operation, and may perform sidelink communication by using the selected resources. When the partial sensing operation is performed for all periodicities, power consumption of the terminal may increase. In addition, when continuous transmission conflicts occur in the resources selected by the random selection operation, the performance of sidelink communication may be deteriorated. Methods for solving these problems are required.

SUMMARY

Accordingly, exemplary embodiments of the present disclosure are directed to providing methods and apparatuses for power saving in sidelink communication.

According to a first exemplary embodiment of the present disclosure, an operation method of a first terminal in a communication system may comprise: receiving, from a base station, configuration information including information of n periodicities; selecting one or more periodicities among the n periodicities; performing a partial sensing operation by using the one or more periodicities; and performing sidelink communication with a second terminal based on a result of the partial sensing operation, wherein n is a natural number equal to or greater than 2.

The n periodicities may be configured for each resource pool, and the configuration information may be configuration information of the resource pool.

The configuration information may be received from the base station through system information or a radio resource control (RRC) message.

The operation method may further comprise receiving a threshold from the base station, wherein each of the one or more periodicities is a periodicity equal to or greater than the threshold among the n periodicities.

The partial sensing operation may not be performed for at least one periodicity less than the threshold among the n periodicities.

The operation method may further comprise receiving information of a subset of the n periodicities from the base station, wherein the partial sensing operation is not performed for at least one periodicity not belonging to the subset.

A priority of a resource determined by the partial sensing operation may be set to be higher than a priority of a resource determined by a full sensing operation.

The operation method may further comprise transmitting information indicating that a resource determined by the partial sensing operation is used by the first terminal.

According to a second exemplary embodiment of the present disclosure, an operation method of a first terminal in a communication system may comprise: selecting one or more first resources by performing a random selection operation; performing sidelink communication with a second terminal by using the one or more first resources; selecting one or more second resources by applying an offset to the one or more first resources in a first period; and performing the sidelink communication with the second terminal by using the one or more second resources, wherein the offset is set differently for each terminal.

The operation method may further comprise receiving, from a base station, information on the offset, wherein the information on the offset is received through at least one of system information, a radio resource control (RRC) message, a medium access control (MAC) control element (CE), or control information.

The offset may be obtained by substituting at least one of an identifier (ID) of the first terminal or an ID of the second terminal into a function.

The one or more second resources may be obtained by applying the offset and a resource reselection counter value together to the one or more first resources.

The sidelink communication may be performed within a resource pool configured in the first terminal, and a modulo operation may be additionally performed so that the one or more second resources do not deviate from the resource pool.

The random selection operation may be performed before a resource reselection counter value reaches 0 when continuous resource conflicts are determined as being occurred.

When the number of negative acknowledgments (NACKs) received from the second terminal is equal to or greater than a threshold or information indicating that a resource conflict occurs is continuously received from the second terminal, the continuous resource conflicts may be determined as being occurred.

A priority of the resources selected by the random selection operation may be set to be higher than a priority of resources selected by a full sensing operation.

The operation method may further comprise transmitting information indicating that resources selected by the random selection operation are used by the first terminal.

According to a third exemplary embodiment of the present disclosure, a first terminal in a communication system may comprise: a processor; a memory electronically communicating with the processor; and instructions stored in the memory, wherein when executed by the processor, the instructions cause the first terminal to: receive, from a base station, configuration information including information of n periodicities; select one or more periodicities among the n periodicities; perform a partial sensing operation by using the one or more periodicities; and perform sidelink communication with a second terminal based on a result of the partial sensing operation, wherein n is a natural number equal to or greater than 2.

The instructions may further cause the first terminal to receive information of a subset of the n periodicities from the base station, wherein the partial sensing operation may not be performed for at least one periodicity not belonging to the subset.

A priority of a resource determined by the partial sensing operation may be set to be higher than a priority of a resource determined by a full sensing operation.

According to the exemplary embodiments of the present disclosure, the terminal may perform a partial sensing operation for one or more periodicities determined according to a specific criterion among all periodicities. Accordingly, power consumption of the terminal may be reduced. The terminal may select a first resource by performing a random selection operation, and may determine a resource of each period by applying an offset to the preceding resource. According to such the operations, continuous resource conflicts may be prevented from occurring. Therefore, the efficiency of resource use can be improved.

BRIEF DESCRIPTION OF DRAWINGS

FIG. 7 is a conceptual diagram illustrating a second exemplary embodiment of a method of transmitting SS/PBCH blocks in a communication system.

DETAILED DESCRIPTION OF THE EMBODIMENTS

Figure 1:
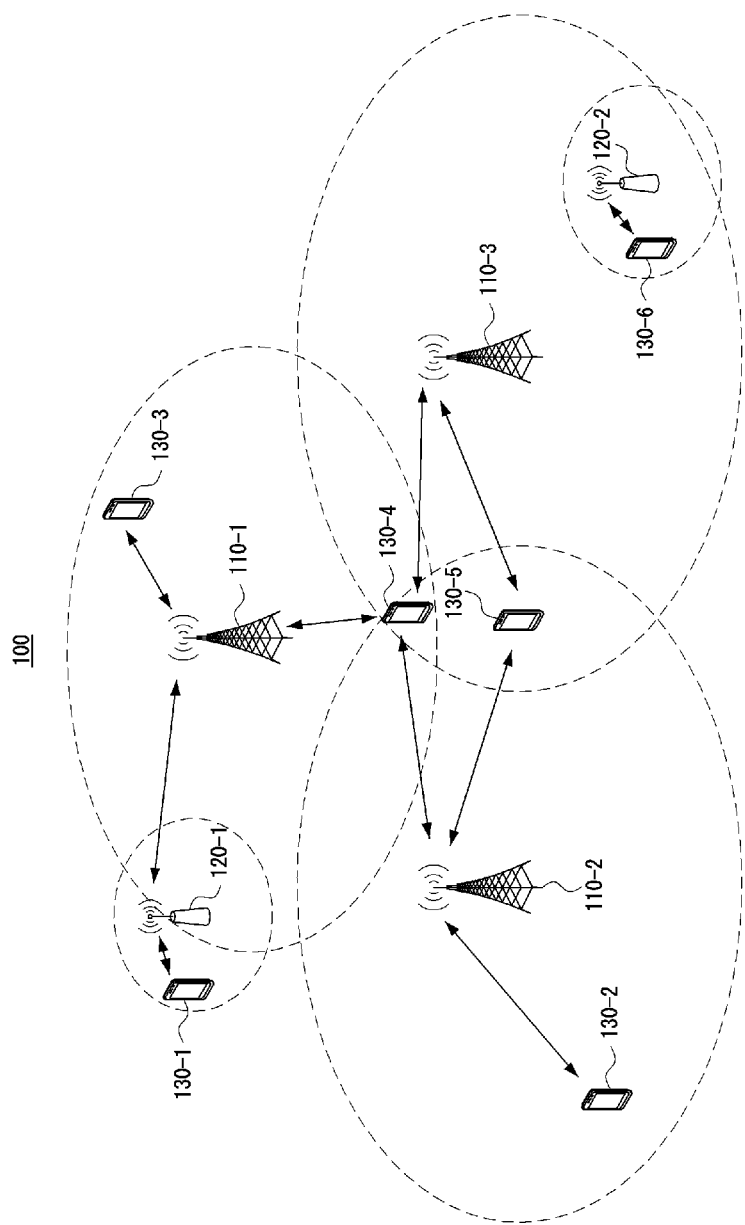
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. In addition, the communication system 100 may further comprise a core network (e.g., a serving gateway (S-GW), a packet data network (PDN) gateway (P-GW), and a mobility management entity (MME)). When the communication system 100 is a 5G communication system (e.g., new radio (NR) system), the core network may include an access and mobility management function (AMF), a user plane function (UPF), a session management function (SMF), and the like.

The plurality of communication nodes 110 to 130 may support a communication protocol defined by the 3rd generation partnership project (3GPP) specifications (e.g., LTE communication protocol, LTE-A communication protocol, NR communication protocol, or the like). The plurality of communication nodes 110 to 130 may support code division multiple access (CDMA) technology, wideband CDMA (WCDMA) technology, time division multiple access (TDMA) technology, frequency division multiple access (FDMA) technology, orthogonal frequency division multiplexing (OFDM) technology, filtered OFDM technology, cyclic prefix OFDM (CP-OFDM) technology, discrete Fourier transform-spread-OFDM (DFT-s-OFDM) technology, orthogonal frequency division multiple access (OFDMA) technology, single carrier FDMA (SC-FDMA) technology, non-orthogonal multiple access (NOMA) technology, generalized frequency division multiplexing (GFDM) technology, filter band multi-carrier (FBMC) technology, universal filtered multi-carrier (UFMC) technology, space division multiple access (SDMA) technology, or the like. Each of the plurality of communication nodes may have the following structure.

Figure 2:
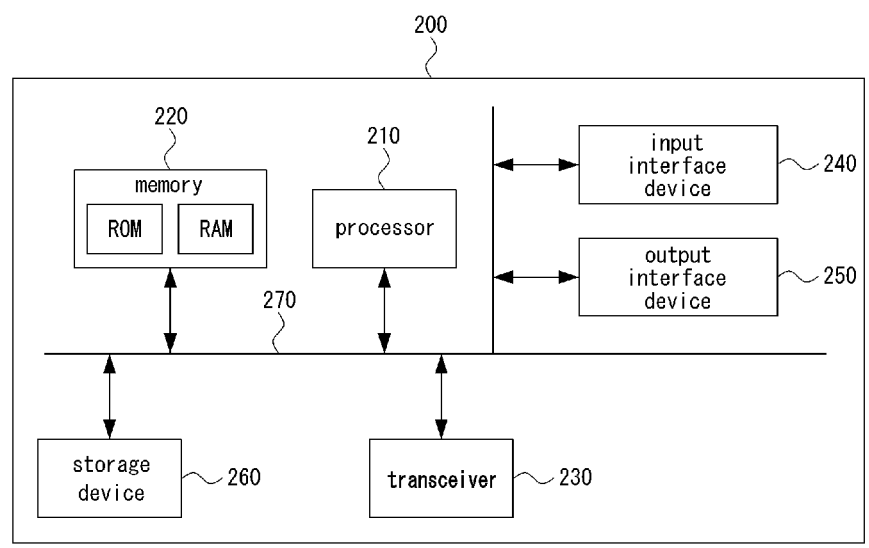
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B (NB), a evolved Node-B (eNB), a gNB, an advanced base station (ABS), a high reliability-base station (HR-BS), a base transceiver station (BTS), a radio base station, a radio transceiver, an access point, an access node, a radio access station (RAS), a mobile multihop relay-base station (MMR- BS), a relay station (RS), an advanced relay station (ARS), a high reliability-relay station (HR-RS), a home NodeB (HNB), a home eNodeB (HeNB), a road side unit (RSU), a radio remote head (RRH), a transmission point (TP), a transmission and reception point (TRP), or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on-board unit (OBU), or the like.

Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, device-to-device (D2D) communication (or, proximity services (ProSe)), Internet of Things (IoT) communications, dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, the communication system may support three types of frame structures. A type 1 frame structure may be applied to a frequency division duplex (FDD) communication system, a type 2 frame structure may be applied to a time division duplex (TDD) communication system, and a type 3 frame structure may be applied to an unlicensed band based communication system (e.g., a licensed assisted access (LAA) communication system).

Figure 3:
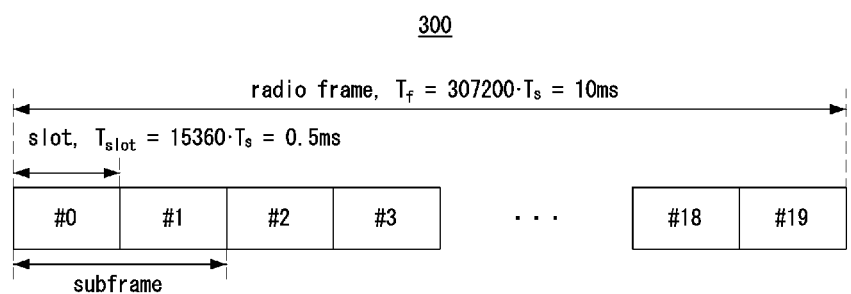
FIG. 3 is a conceptual diagram illustrating a first exemplary embodiment of a type 1 frame.

FIG. 3 is a conceptual diagram illustrating a first exemplary embodiment of a type 1 frame.

Referring to FIG. 3, a radio frame 300 may comprise 10 subframes, and a subframe may comprise 2 slots. Thus, the radio frame 300 may comprise 20 slots (e.g., slot #0, slot #1, slot #2, slot #3, . . . , slot #18, and slot #19). The length $T_f$ of the radio frame 300 may be 10 milliseconds (ms). The length of the subframe may be 1 ms, and the length $T_{slot}$ of a slot may be 0.5 ms. Here, $T_s$ may indicate a sampling time, and may be 1/30,720,000 s.

The slot may be composed of a plurality of OFDM symbols in the time domain, and may be composed of a plurality of resource blocks (RBs) in the frequency domain. The RB may be composed of a plurality of subcarriers in the frequency domain. The number of OFDM symbols constituting the slot may vary depending on configuration of a cyclic prefix (CP). The CP may be classified into a normal CP and an extended CP. If the normal CP is used, the slot may be composed of 7 OFDM symbols, in which case the subframe may be composed of 14 OFDM symbols. If the extended CP is used, the slot may be composed of 6 OFDM symbols, in which case the subframe may be composed of 12 OFDM symbols.

Figure 4:
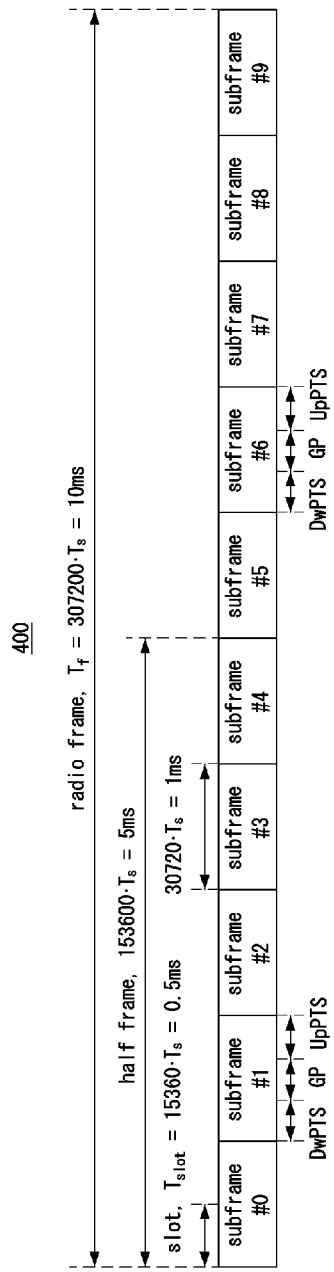
FIG. 4 is a conceptual diagram illustrating a first exemplary embodiment of a type 2 frame.

FIG. 4 is a conceptual diagram illustrating a first exemplary embodiment of a type 2 frame.

Referring to FIG. 4, a radio frame 400 may comprise two half frames, and a half frame may comprise 5 subframes. Thus, the radio frame 400 may comprise 10 subframes. The length $T_f$ of the radio frame 400 may be 10 ms. The length of the half frame may be 5 ms. The length of the subframe may be 1 ms. Here, $T_s$ may be 1/30,720,000 s.

The radio frame 400 may include at least one downlink subframe, at least one uplink subframe, and a least one special subframe. Each of the downlink subframe and the uplink subframe may include two slots. The length $T_{slot}$ of a slot may be 0.5 ms. Among the subframes included in the radio frame 400, each of the subframe #1 and the subframe #6 may be a special subframe. For example, when a switching periodicity between downlink and uplink is 5 ms, the radio frame 400 may include 2 special subframes. Alternatively, the switching periodicity between downlink and uplink is 10 ms, the radio frame 400 may include one special subframe. The special subframe may include a downlink pilot time slot (DwPTS), a guard period (GP), and an uplink pilot time slot (UpPTS).

The downlink pilot time slot may be regarded as a downlink interval and may be used for cell search, time and frequency synchronization acquisition of the terminal, channel estimation, and the like. The guard period may be used for resolving interference problems of uplink data transmission caused by delay of downlink data reception. Also, the guard period may include a time required for switching from the downlink data reception operation to the uplink data transmission operation. The uplink pilot time slot may be used for uplink channel estimation, time and frequency synchronization acquisition, and the like. Transmission of a physical random access channel (PRACH) or a sounding reference signal (SRS) may be performed in the uplink pilot time slot.

The lengths of the downlink pilot time slot, the guard period, and the uplink pilot time slot included in the special subframe may be variably adjusted as needed. In addition, the number and position of each of the downlink subframe, the uplink subframe, and the special subframe included in the radio frame 400 may be changed as needed.

In the communication system, a transmission time interval (TTI) may be a basic time unit for transmitting coded data through a physical layer. A short TTI may be used to support low latency requirements in the communication system. The length of the short TTI may be less than 1 ms. The conventional TTI having a length of 1 ms may be referred to as a base TTI or a regular TTI. That is, the base TTI may be composed of one subframe. In order to support transmission on a base TTI basis, signals and channels may be configured on a subframe basis. For example, a cell-specific reference signal (CRS), a physical downlink control channel (PDCCH), a physical downlink shared channel (PDSCH), a physical uplink control channel (PUCCH), a physical uplink shared channel (PUSCH), and the like may exist in each subframe.

On the other hand, a synchronization signal (e.g., a primary synchronization signal (PSS) and a secondary synchronization signal (SSS)) may exist for every 5 subframes, and a physical broadcast channel (PBCH) may exist for every 10 subframes. Also, each radio frame may be identified by an SFN, and the SFN may be used for defining transmission of a signal (e.g., a paging signal, a reference signal for channel estimation, a signal for channel state information, etc.) longer than one radio frame. The periodicity of the SFN may be 1024.

In the LTE system, the PBCH may be a physical layer channel used for transmission of system information (e.g., master information block (MIB)). The PBCH may be transmitted every 10 subframes. That is, the transmission periodicity of the PBCH may be 10 ms, and the PBCH may be transmitted once in the radio frame. The same MIB may be transmitted during 4 consecutive radio frames, and after 4 consecutive radio frames, the MIB may be changed according to a situation of the LTE system. The transmission period for which the same MIB is transmitted may be referred to as a 'PBCH TTI', and the PBCH TTI may be 40 ms. That is, the MIB may be changed for each PBCH TTI.

The MIB may be composed of 40 bits. Among the 40 bits constituting the MIB, 3 bits may be used to indicate a system band, 3 bits may be used to indicate physical hybrid automatic repeat request (ARID) indicator channel (PHICH) related information, 8 bits may be used to indicate an SFN, 10 bits may be configured as reserved bits, and 16 bits may be used for a cyclic redundancy check (CRC).

The SFN for identifying the radio frame may be composed of a total of 10 bits (B9 to B0), and the most significant bits (MSBs) 8 bits (B9 to B2) among the 10 bits may be indicated by the PBCH (i.e., MIB). The MSBs 8 bits (B9 to B2) of the SFN indicated by the PBCH (i.e., MIB) may be identical during 4 consecutive radio frames (i.e., PBCH TTI). The least significant bits (LSBs) 2 bits (B1 to B0) of the SFN may be changed during 4 consecutive radio frames (i.e., PBCH TTI), and may not be explicitly indicated by the PBCH (i.e., MIB). The LSBs (2 bits (B1 to B0)) of the SFN may be implicitly indicated by a scrambling sequence of the PBCH (hereinafter referred to as 'PBCH scrambling sequence').

A gold sequence generated by being initialized by a cell ID may be used as the PBCH scrambling sequence, and the PBCH scrambling sequence may be initialized for each four consecutive radio frames (e.g., each PBCH TTI) based on an operation of 'mod (SFN, 4)'. The PBCH transmitted in a radio frame corresponding to an SFN with LSBs 2 bits (B1 to B0) set to '00' may be scrambled by the gold sequence generated by being initialized by the cell ID. Thereafter, the gold sequences generated according to the operation of 'mod (SFN, 4)' may be used to scramble the PBCH transmitted in the radio frames corresponding to SFNs with LSBs 2 bits (B1 to B0) set to '01', '10', and '11'.

Accordingly, the terminal having acquired the cell ID in the initial cell search process may identify the value of the LSBs 2 bits (B1 to B0) of the SFN (e.g., '00', '01', '10', or '11') based on the PBCH scramble sequence obtained in the decoding process for the PBCH (i.e., MIB). The terminal may use the LSBs 2 bits (B1 to B0) of the SFN obtained based on the PBCH scrambling sequence and the MSBs 8 bits (B9 to B2) of the SFN indicated by the PBCH (i.e., MIB) so as to identify the SFN (i.e., the entire bits B9 to B0 of the SFN).

On the other hand, the communication system may support not only a high transmission rate but also technical requirements for various service scenarios. For example, the communication system may support an enhanced mobile broadband (eMBB) service, an ultra-reliable low-latency communication (URLLC) service, a massive machine type communication (mMTC) service, and the like.

The subcarrier spacing of the communication system (e.g., OFDM-based communication system) may be determined based on a carrier frequency offset (CFO) and the like. The CFO may be generated by a Doppler effect, a phase drift, or the like, and may increase in proportion to an operation frequency. Therefore, in order to prevent the performance degradation of the communication system due to the CFO, the subcarrier spacing may increase in proportion to the operation frequency. On the other hand, as the subcarrier spacing increases, a CP overhead may increase. Therefore, the subcarrier spacing may be configured based on a channel characteristic, a radio frequency (RF) characteristic, etc. according to a frequency band.

The communication system may support numerologies defined in Table 1 below.

TABLE 1

| Numerology (μ) | 0 | 1 | 2 | 3 | 4 | 5 |
|---|---|---|---|---|---|---|
| Subcarrier spacing | 15 kHz | 30 kHz | 60 kHz | 120 kHz | 240 kHz | 480 kHz |
| OFDM symbol length [us] | 66.7 | 33.3 | 16.7 | 8.3 | 4.2 | 2.1 |
| CP length [us] | 4.76 | 2.38 | 1.19 | 0.60 | 0.30 | 0.15 |
| Number of OFDM symbols within 1 ms | 14 | 28 | 56 | 112 | 224 | 448 |

For example, the subcarrier spacing of the communication system may be configured to 15 kHz, 30 kHz, 60 kHz, or 120 kHz. The subcarrier spacing of the LTE system may be 15 kHz, and the subcarrier spacing of the NR system may be 1, 2, 4, or 8 times the conventional subcarrier spacing of 15 kHz. If the subcarrier spacing increases by exponentiation units of 2 of the conventional subcarrier spacing, the frame structure can be easily designed.

The communication system may support a wide frequency band (e.g., several hundred MHz to tens of GHz). Since the diffraction characteristic and the reflection characteristic of the radio wave are poor in a high frequency band, a propagation loss (e.g., path loss, reflection loss, and the like) in a high frequency band may be larger than a propagation loss in a low frequency band. Therefore, a cell coverage of a communication system supporting a high frequency band may be smaller than a cell coverage of a communication system supporting a low frequency band. In order to solve such the problem, a beamforming scheme based on a plurality of antenna elements may be used to increase the cell coverage in the communication system supporting a high frequency band.

The beamforming scheme may include a digital beamforming scheme, an analog beamforming scheme, a hybrid beamforming scheme, and the like. In the communication system using the digital beamforming scheme, a beamforming gain may be obtained using a plurality of RF paths based on a digital precoder or a codebook. In the communication system using the analog beamforming scheme, a beamforming gain may be obtained using analog RF devices (e.g., phase shifter, power amplifier (PA), variable gain amplifier (VGA), and the like) and an antenna array.

Because of the need for expensive digital to analog converters (DACs) or analog to digital converters (ADCs) for digital beamforming schemes and transceiver units corresponding to the number of antenna elements, the complexity of antenna implementation may be increased to increase the beamforming gain. In case of the communication system using the analog beamforming scheme, since a plurality of antenna elements are connected to one transceiver unit through phase shifters, the complexity of the antenna implementation may not increase greatly even if the beamforming gain is increased. However, the beamforming performance of the communication system using the analog beamforming scheme may be lower than the beamforming performance of the communication system using the digital beamforming scheme. Further, in the communication system using the analog beamforming scheme, since the phase shifter is adjusted in the time domain, frequency resources may not be efficiently used. Therefore, a hybrid beam forming scheme, which is a combination of the digital scheme and the analog scheme, may be used.

When the cell coverage is increased by the use of the beamforming scheme, common control channels and common signals (e.g., reference signal and synchronization signal) for all terminals belonging to the cell coverage as well as control channels and data channels for each terminal may also be transmitted based on the beamforming scheme. In this case, the common control channels and the common signals for all terminals belonging to the cell coverage may be transmitted based on a beam sweeping scheme.

In addition, in the NR system, a synchronization signal/physical broadcast channel (SS/PBCH) block may also be transmitted in a beam sweeping scheme. The SS/PBCH block may be composed of a PSS, an SSS, a PBCH, and the like. In the SS/PBCH block, the PSS, the SSS, and the PBCH may be configured in a time division multiplexing (TDM) manner. The SS/PBCH block may be referred also to as an 'SS block (SSB)'. One SS/PBCH block may be transmitted using N consecutive OFDM symbols. Here, N may be an integer equal to or greater than 4. The base station may periodically transmit the SS/PBCH block, and the terminal may acquire frequency/time synchronization, a cell ID, system information, and the like based on the SS/PBCH block received from the base station. The SS/PBCH block may be transmitted as follows.

Figure 5:
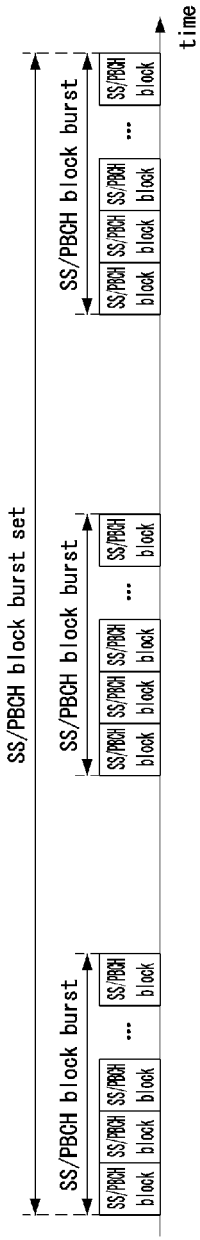
FIG. 5 is a conceptual diagram illustrating a first exemplary embodiment of a transmission method of SS/PBCH block in a communication system.

FIG. 5 is a conceptual diagram illustrating a first exemplary embodiment of a transmission method of SS/PBCH block in a communication system.

Referring to FIG. 5, one or more SS/PBCH blocks may be transmitted in a beam sweeping scheme within an SS/PBCH block burst set. Up to L SS/PBCH blocks may be transmitted within one SS/PBCH block burst set. L may be an integer equal to or greater than 2, and may be defined in the 3GPP standard. Depending on a region of a system frequency, L may vary. Within the SS/PBCH block burst set, the SS/PBCH blocks may be located consecutively or distributedly. The consecutive SS/PBCH blocks may be referred to as an 'SS/PBCH block burst'. The SS/PBCH block burst set may be repeated periodically, and system information (e.g., MIB) transmitted through the PBCHs of the SS/PBCH blocks within the SS/PBCH block burst set may be the same. An index of the SS/PBCH block, an index of the SS/PBCH block burst, an index of an OFDM symbol, an index of a slot, and the like may be indicated explicitly or implicitly by the PBCH.

Figure 6:
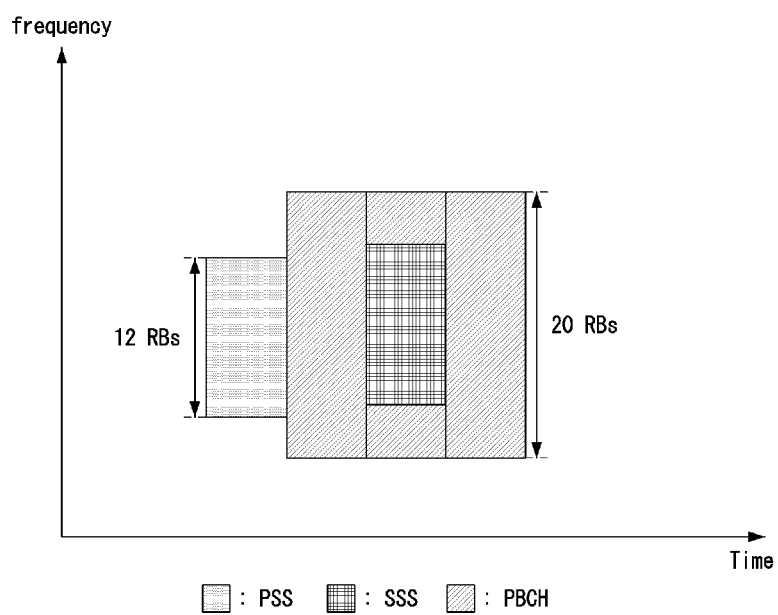
FIG. 6 is a conceptual diagram illustrating a first exemplary embodiment of an SS/PBCH block in a communication system.

FIG. 6 is a conceptual diagram illustrating a first exemplary embodiment of an SS/PBCH block in a communication system.

Referring to FIG. 6, signals and a channel are arranged within one SS/PBCH block in the order of 'PSS→PBCH→SSS→PBCH'. The PSS, SSS, and PBCH within the SS/PBCH block may be configured in a TDM scheme. In a symbol where the SSS is located, the PBCH may be located in frequency resources above the SSS and frequency resources below the SSS. That is, the PBCH may be transmitted in both end bands adjacent to the frequency band in which the SSS is transmitted. When the maximum number of SS/PBCH blocks is 8 in the sub 6 GHz frequency band, an SS/PBCH block index may be identified based on a demodulation reference signal used for demodulating the PBCH (hereinafter, referred to as 'PBCH DMRS'). When the maximum number of SSBs is 64 in the over 6 GHz frequency band, LSB 3 bits of 6 bits representing the SS/PBCH block index may be identified based on the PBCH DMRS, and the remaining MSB 3 bits may be identified based on a payload of the PBCH.

The maximum system bandwidth that can be supported in the NR system may be 400 MHz. The size of the maximum bandwidth that can be supported by the terminal may vary depending on the capability of the terminal. Therefore, the terminal may perform an initial access procedure (e.g., initial connection procedure) by using some of the system bandwidth of the NR system supporting a wide band. In order to support access procedures of terminals supporting various sizes of bandwidths, SS/PBCH blocks may be multiplexed in the frequency domain within the system bandwidth of the NR system supporting a wide band. In this case, the SS/PBCH blocks may be transmitted as follows.

FIG. 7 is a conceptual diagram illustrating a second exemplary embodiment of a method of transmitting SS/PBCH blocks in a communication system.

Referring to FIG. 7, a wideband component carrier (CC) may include a plurality of bandwidth parts (BWPs). For example, the wideband CC may include 4 BWPs. The base station may transmit SS/PBCH blocks in the respective BWPs #0 to #3 belonging to the wideband CC. The terminal may receive the SS/PBCH block(s) from one or more BWPs of the BWPs #0 to #3, and may perform an initial access procedure using the received SS/PBCH block.

After detecting the SS/PBCH block, the terminal may acquire system information (e.g., remaining minimum system information (RMSI)), and may perform a cell access procedure based on the system information. The RMSI may be transmitted on a PDSCH scheduled by a PDCCH. Configuration information of a control resource set (CORESET) in which the PDCCH including scheduling information of the PDSCH through which the RMSI is transmitted may be transmitted on a PBCH within the SS/PBCH block. A plurality of SS/PBCH blocks may be transmitted in the entire system band, and one or more SS/PBCH blocks among the plurality of SS/PBCH blocks may be SS/PBCH block(s) associated with the RMSI. The remaining SS/PBCH blocks may not be associated with the RMSI. The SS/PBCH block associated with the RMSI may be defined as a 'cell defining SS/PBCH block'. The terminal may perform a cell search procedure and an initial access procedure by using the cell-defining SS/PBCH block. The SS/PBCH block not associated with the RMSI may be used for a synchronization procedure and/or a measurement procedure in the corresponding BWP. The BWP(s) through which the SS/PBCH block is transmitted may be limited to one or more BWPs within a wide bandwidth.

The RMSI may be obtained by performing an operation to obtain configuration information of a CORESET from the SS/PBCH block (e.g., PBCH), an operation of detecting a PDCCH based on the configuration information of the CORESET, an operation to obtain scheduling information of a PDSCH from the PDCCH, and an operation to receive the RMSI through the PDSCH. A transmission resource of the PDCCH may be configured by the configuration information of the CORESET. A mapping patter of the RMSI CORESET pattern may be defined as follows. The RMSI CORESET may be a CORESET used for transmission and reception of the RMSI.

Figure 8A:
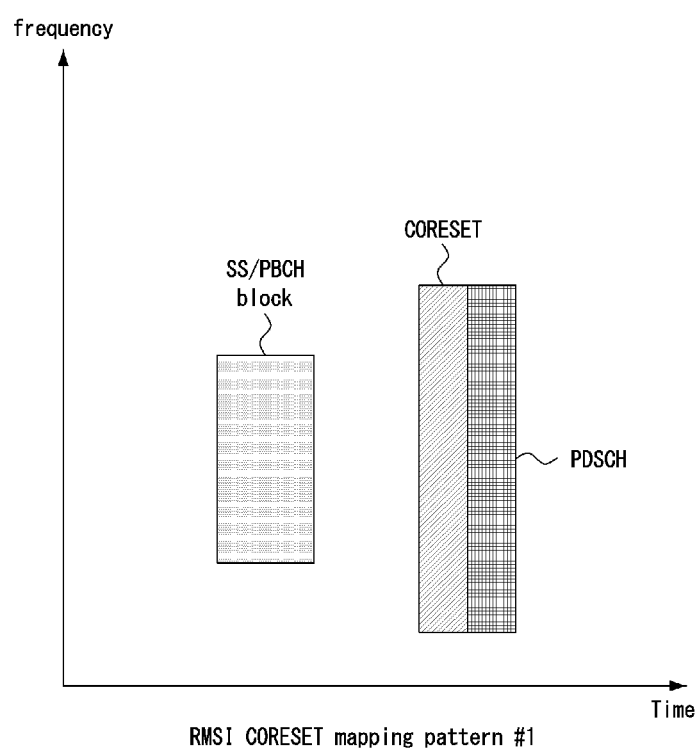
FIG. 8A is a conceptual diagram illustrating an RMSI CORESET mapping pattern #1 in a communication system.
Figure 8B:
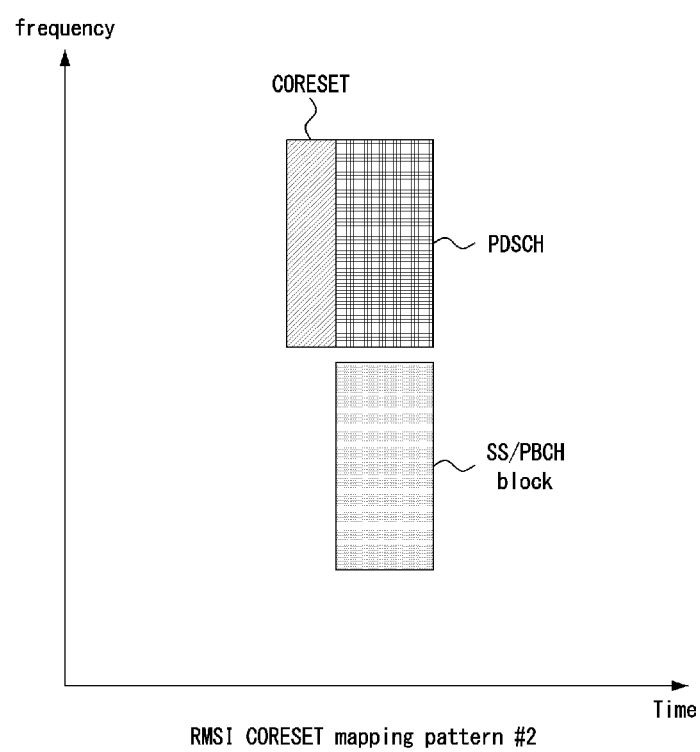
FIG. 8B is a conceptual diagram illustrating an RMSI CORESET mapping pattern #2 in a communication system.
Figure 8C:
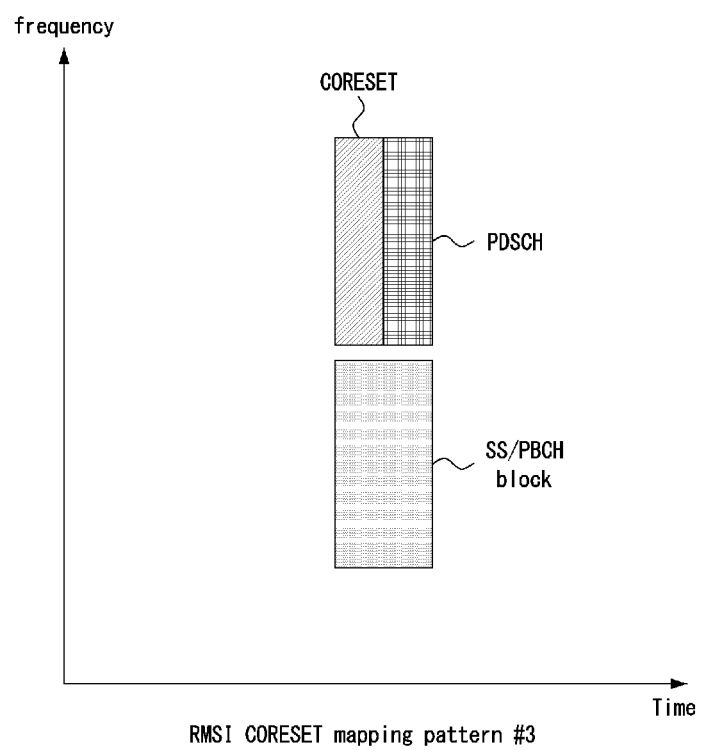
FIG. 8C is a conceptual diagram illustrating an RMSI CORESET mapping pattern #3 in a communication system.

FIG. 8A is a conceptual diagram illustrating an RMSI CORESET mapping pattern #1 in a communication system, FIG. 8B is a conceptual diagram illustrating an RMSI CORESET mapping pattern #2 in a communication system, and FIG. 8C is a conceptual diagram illustrating an RMSI CORESET mapping pattern #3 in a communication system.

Referring to FIGS. 8A to 8C, one RMSI CORESET mapping pattern among the RMSI CORESET mapping patterns #1 to #3 may be used, and a detailed configuration according to the one RMSI CORESET mapping pattern may be determined. In the RMSI CORESET mapping pattern #1, the SS/PBCH block, the CORESET (i.e., RMSI CORE-SET), and the PDSCH (i.e., RMSI PDSCH) may be configured in a TDM scheme. The RMSI PDSCH may mean the PDSCH through which the RMSI is transmitted. In the RMSI CORESET mapping pattern #2, the CORESET (i.e., RMSI CORESET) and the PDSCH (i.e., RMSI PDSCH) may be configured in a TDM scheme, and the PDSCH (i.e., RMSI PDSCH) and the SS/PBCH block may be configured in a frequency division multiplexing (FDM) scheme. In the RMSI CORESET mapping pattern #3, the CORESET (i.e., RMSI CORESET) and the PDSCH (i.e., RMSI PDSCH) may be configured in a TDM scheme, and the CORESET (i.e., RMSI CORESET) and the PDSCH (i.e., RMSI PDSCH) may be multiplexed with the SS/PBCH block in a FDM scheme.

In the frequency band of 6 GHz or below, only the RMSI CORESET mapping pattern #1 may be used. In the frequency band of 6 GHz or above, all of the RMSI CORESET mapping patterns #1, #2, and #3 may be used. The numerology of the SS/PBCH block may be different from that of the RMSI CORESET and the RMSI PDSCH. Here, the numerology may be a subcarrier spacing. In the RMSI CORESET mapping pattern #1, a combination of all numerologies may be used. In the RMSI CORESET mapping pattern #2, a combination of numerologies (120 kHz, 60 kHz) or (240 kHz, 120 kHz) may be used for the SS/PBCH block and the RMSI CORESET/PDSCH. In the RMSI CORESET mapping pattern #3, a combination of numerologies (120 kHz, 120 kHz) may be used for the SS/PBCH block and the RMSI CORESET/PDSCH.

One RMSI CORESET mapping pattern may be selected from the RMSI CORESET mapping patterns #1 to #3 according to the combination of the numerology of the SS/PBCH block and the numerology of the RMSI CORESET/PDSCH. The configuration information of the RMSI CORESET may include Table A and Table B. Table A may represent the number of resource blocks (RBs) of the RMSI CORESET, the number of symbols of the RMSI CORESET, and an offset between an RB (e.g., starting RB or ending RB) of the SS/PBCH block and an RB (e.g., starting RB or ending RB) of the RMSI CORESET. Table B may represent the number of search space sets per slot, an offset of the RMSI CORESET, and an OFDM symbol index in each of the RMSI CORESET mapping patterns. Table B may represent information for configuring a monitoring occasion of the RMSI PDCCH. Each of Table A and Table B may be composed of a plurality of sub-tables. For example, Table A may include sub-tables 13-1 to 13-8 defined in the technical specification (TS) 38.213, and Table B may include sub-tables 13-9 to 13-13 defined in the TS 38.213. The size of each of Table A and Table B may be 4 bits.

In the NR system, a PDSCH may be mapped to the time domain according to a PDSCH mapping type A or a PDSCH mapping type B. The PDSCH mapping types A and B may be defined as Table 2 below.

TABLE 2

| PDSCH mapping type | Normal CP | | | Extended CP | | |
|---|---|---|---|---|---|---|
| | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

(Note 1):
S = 3 is applicable only if dmrs-TypeA-Position = 3

The type A (i.e., PDSCH mapping type A) may be slot-based transmission. When the type A is used, a position of a start symbol of a PDSCH may be configured to one of {0, 1, 2, 3}. When the type A and a normal CP are used, the number of symbols constituting the PDSCH (e.g., the duration of the PDSCH) may be configured to one of 3 to 14 within a range not exceeding a slot boundary. The type B (i.e., PDSCH mapping type B) may be non-slot-based transmission. When the type B is used, a position of a start symbol of a PDSCH may be configured to one of 0 to 12. When the type B and the normal CP are used, the number of symbols constituting the PDSCH (e.g., the duration of the PDSCH) may be configured to one of {2, 4, 7} within a range not exceeding a slot boundary. A DMRS (hereinafter, referred to as 'PDSCH DMRS') for demodulation of the PDSCH (e.g., data) may be determined by a value of ID indicating the PDSCH mapping type (e.g., type A or type B) and the length. The ID may be defined differently according to the PDSCH mapping type.

Meanwhile, NR-unlicensed (NR-U) is being discussed in the NR standardization meeting. The NR-U system may increase network capacity by improving the utilization of limited frequency resources. The NR-U system may support operation in an unlicensed band (e.g., unlicensed spectrum).

In the NR-U system, the terminal may determine whether a signal is transmitted from a base station based on a discovery reference signal (DRS) received from the corresponding base station in the same manner as in the general NR system. In the NR-U system in a Stand-Alone (SA) mode, the terminal may acquire synchronization and/or system information based on the DRS. In the NR-U system, the DRS may be transmitted according to a regulation of the unlicensed band (e.g., transmission band, transmission power, transmission time, etc.). For example, according to Occupied Channel Bandwidth (OCB) regulations, signals may be configured and/or transmitted to occupy 80% of the total channel bandwidth (e.g., 20 MHz).

In the NR-U system, a communication node (e.g., base station, terminal) may perform a Listen Before Talk (LBT) procedure before transmitting a signal and/or a channel for coexistence with another system. The signal may be a synchronization signal, a reference signal (e.g., DRS, DMRS, channel state information (CSI)-RS, phase tracking (PT)-RS, sounding reference signal (SRS)), or the like. The channel may be a downlink channel, an uplink channel, a sidelink channel, or the like. In exemplary embodiments, a signal may mean the 'signal', the 'channel', or the 'signal and channel'. The LBT procedure may be an operation for checking whether a signal is transmitted by another communication node. If it is determined by the LBT procedure that there is no transmission signal (e.g., when the LBT procedure is successful), the communication node may transmit a signal in the unlicensed band. If it is determined by the LBT procedure that a transmission signal exists (e.g., when the LBT fails), the communication node may not be able to transmit a signal in the unlicensed band. The communication node may perform a LBT procedure according to one of various categories before transmission of a signal. The category of LBT may vary depending on the type of the transmission signal.

Meanwhile, NR vehicle-to-everything (V2X) communication technology is being discussed in the NR standardization meeting. The NR V2X communication technology may be a technology that supports communication between vehicles, communication between a vehicle and an infrastructure, communication between a vehicle and a pedestrian, and the like based on device-to-device (D2D) communication technologies.

The NR V2X communication (e.g., sidelink communication) may be performed according to three transmission schemes (e.g., unicast scheme, broadcast scheme, groupcast scheme). When the unicast scheme is used, a PC5-RRC connection may be established between a first terminal (e.g. transmitting terminal that transmits data) and a second terminal (e.g., receiving terminal that receives data), and the PC5-RRC connection may refer to a logical connection for a pair between a source ID of the first terminal and a destination ID of the second terminal. The first terminal may transmit data (e.g., sidelink data) to the second terminal. When the broadcast scheme is used, the first terminal may transmit data to all terminals. When the groupcast scheme is used, the first terminal may transmit data to a group (e.g., groupcast group) composed of a plurality of terminals.

When the unicast scheme is used, the second terminal may transmit feedback information (e.g., acknowledgment (ACK) or negative ACK (NACK)) to the first terminal in response to data received from the first terminal. In the exemplary embodiments below, the feedback information may be referred to as a 'HARQ-ACK', 'feedback signal', a 'physical sidelink feedback channel (PSFCH) signal', or the like. When ACK is received from the second terminal, the first terminal may determine that the data has been successfully received at the second terminal. When NACK is received from the second terminal, the first terminal may determine that the second terminal has failed to receive the data. In this case, the first terminal may transmit additional information to the second terminal based on an HARQ scheme. Alternatively, the first terminal may improve a reception probability of the data at the second terminal by retransmitting the same data to the second terminal.

When the broadcast scheme is used, a procedure for transmitting feedback information for data may not be performed. For example, system information may be transmitted in the broadcast scheme, and the terminal may not transmit feedback information for the system information to the base station. Therefore, the base station may not identify whether the system information has been successfully received at the terminal. To solve this problem, the base station may periodically broadcast the system information.

When the groupcast scheme is used, a procedure for transmitting feedback information for data may not be performed. For example, necessary information may be periodically transmitted in the groupcast scheme, without the procedure for transmitting feedback information. However, when the candidates of terminals participating in the groupcast scheme-based communication and/or the number of the terminals participating in that is limited, and the data transmitted in the groupcast scheme is data that should be received within a preconfigured time (e.g., data sensitive to delay), it may be necessary to transmit feedback information also in the groupcast sidelink communication. The groupcast sidelink communication may mean sidelink communication performed in the groupcast scheme. When the feedback information transmission procedure is performed in the groupcast sidelink communication, data can be transmitted and received efficiently and reliably.

In the groupcast sidelink communication, two HARQ-ACK feedback schemes (i.e., transmission procedures of feedback information) may be supported. When the number of receiving terminals in a sidelink group is large and a service scenario 1 is supported, some receiving terminals belonging to a specific range within the sidelink group may transmit NACK through a PSFCH when data reception fails. This scheme may be a groupcast HARQ-ACK feedback option 1. In the service scenario 1, instead of all the receiving terminals in the sidelink group, it may be allowed for some receiving terminals belonging to a specific range to perform reception in a best-effort manner. The service scenario 1 may be an extended sensor scenario in which some receiving terminals belonging to a specific range need to receive the same sensor information from a transmitting terminal. In exemplary embodiments, the transmitting terminal may refer to a terminal transmitting data, and the receiving terminal may refer to a terminal receiving data.

When the number of receiving terminals in the sidelink group is limited and a service scenario 2 is supported, each of all the receiving terminals belonging to the sidelink group may report HARQ-ACK for data individually through a separate PSFCH. This scheme may be a groupcast HARQ-ACK feedback option 2. In the service scenario 2, since PSFCH resources are sufficient, the transmitting terminal may perform monitoring on HARQ-ACK feedbacks of all the receiving terminals belonging to the sidelink group, and data reception may be guaranteed at all the receiving terminals belonging to the sidelink group.

In addition, data reliability at the receiving terminal may be improved by appropriately adjusting a transmit power of the transmitting terminal according to a transmission environment. Interference to other terminals may be mitigated by appropriately adjusting the transmit power of the transmitting terminal. Energy efficiency can be improved by reducing unnecessary transmit power. A power control scheme may be classified into an open-loop power control scheme and a closed-loop power control scheme. In the open-loop power control scheme, the transmitting terminal may determine the transmit power in consideration of configuration, a measured environment, etc. In the closed-loop power control scheme, the transmitting terminal may determine the transmit power based on a transmit power control (TPC) command received from the receiving terminal.

It may be difficult due to various causes including a multipath fading channel, interference, and the like to predict a received signal strength at the receiving terminal. Accordingly, the receiving terminal may adjust a receive power level (e.g., receive power range) by performing an automatic gain control (AGC) operation to prevent a quantization error of the received signal and maintain a proper receive power. In the communication system, the terminal may perform the AGC operation using a reference signal received from the base station. However, in the sidelink communication (e.g., V2X communication), the reference signal may not be transmitted from the base station. That is, in the sidelink communication, communication between terminals may be performed without the base station. Therefore, it may be difficult to perform the AGC operation in the sidelink communication. In the sidelink communication, the transmitting terminal may first transmit a signal (e.g., reference signal) to the receiving terminal before transmitting data, and the receiving terminal may adjust a receive power range (e.g., receive power level) by performing an AGC operation based on the signal received from the transmitting terminal. Thereafter, the transmitting terminal may transmit sidelink data to the receiving terminal. The signal used for the AGC operation may be a signal duplicated from a signal to be transmitted later or a signal preconfigured between the terminals.

A time period required for the ACG operation may be 15 μs. When a subcarrier spacing of 15 kHz is used in the NR system, a time period (e.g., length) of one symbol (e.g., OFDM symbol) may be 66.7 vs. When a subcarrier spacing of 30 kHz is used in the NR system, a time period of one symbol (e.g., OFDM symbol) may be 33.3 vs. In the following exemplary embodiments, a symbol may mean an OFDM symbol. That is, a time period of one symbol may be twice or more than a time period required for the ACG operation.

For sidelink communication, it may be necessary to transmit a data channel for data transmission and a control channel including scheduling information for data resource allocation. In sidelink communication, the data channel may be a physical sidelink shared channel (PSSCH), and the control channel may be a physical sidelink control channel (PSCCH). The data channel and the control channel may be multiplexed in a resource domain (e.g., time and frequency resource domains).

Figure 9:
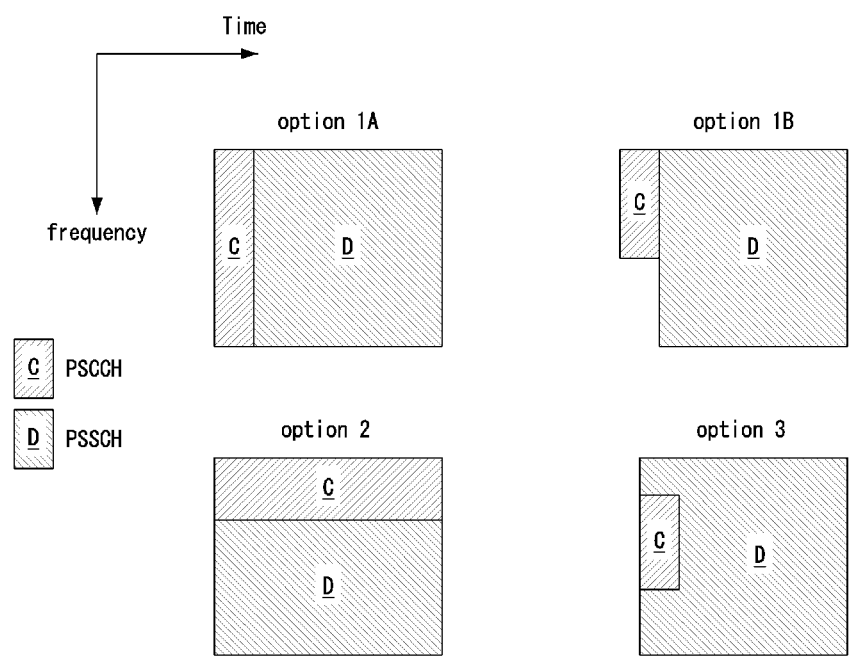
FIG. 9 is a conceptual diagram illustrating exemplary embodiments of a method for multiplexing a control channel and a data channel in sidelink communication.

FIG. 9 is a conceptual diagram illustrating exemplary embodiments of a method for multiplexing a control channel and a data channel in sidelink communication. Referring to FIG. 9, sidelink communication may support an option 1A, an option 1B, an option 2, and an option 3. When the option 1A and/or the option 1B is supported, a control channel and a data channel may be multiplexed in the time domain. When the option 2 is supported, a control channel and a data channel may be multiplexed in the frequency domain. When the option 3 is supported, a control channel and a data channel may be multiplexed in the time and frequency domains. The sidelink communication may basically support the option 3.

In the sidelink communication (e.g., NR-V2X sidelink communication), a basic unit of resource configuration may be a subchannel. The subchannel may be defined with time and frequency resources. For example, the subchannel may be composed of a plurality of symbols (e.g., OFDM symbols) in the time domain, and may be composed of a plurality of resource blocks (RBs) in the frequency domain. The subchannel may be referred to as an RB set. In the subchannel, a data channel and a control channel may be multiplexed based on the option 3.

In the sidelink communication (e.g., NR-V2X sidelink communication), transmission resources may be allocated based on a mode 1 or a mode 2. When the mode 1 is used, a base station may allocate sidelink resource(s) for data transmission within a resource pool to a transmitting terminal, and the transmitting terminal may transmit data to a receiving terminal using the sidelink resource(s) allocated by the base station. Here, the transmitting terminal may be a terminal that transmits data in sidelink communication, and the receiving terminal may be a terminal that receives the data in sidelink communication.

When the mode 2 is used, a transmitting terminal may autonomously select sidelink resource(s) to be used for data transmission by performing a resource sensing operation and/or a resource selection operation within a resource pool. The base station may configure the resource pool for the mode 1 and the resource pool for the mode 2 to the terminal(s). The resource pool for the mode 1 may be configured independently from the resource pool for the mode 2. Alternatively, a common resource pool may be configured for the mode 1 and the mode 2.

When the mode 1 is used, the base station may schedule a resource used for sidelink data transmission to the transmitting terminal, and the transmitting terminal may transmit sidelink data to the receiving terminal by using the resource scheduled by the base station. Therefore, a resource conflict between terminals may be prevented. When the mode 2 is used, the transmitting terminal may select an arbitrary resource by performing a resource sensing operation and/or resource selection operation, and may transmit sidelink data by using the selected arbitrary resource. Since the above-described procedure is performed based on an individual resource sensing operation and/or resource selection operation of each transmitting terminal, a conflict between selected resources may occur.

Hereinafter, methods for power saving of one or more sidelink communications in a communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a transmitting terminal is described, a corresponding receiving terminal may perform an operation corresponding to the operation of the transmitting terminal. Conversely, when an operation of a receiving terminal is described, a corresponding transmitting terminal may perform an operation corresponding to the operation of the receiving terminal.

The sidelink communication system supporting Release-16 may be designed for terminals (e.g., vehicle-mounted terminals, vehicle UEs (V-UEs)) that do not have restrictions on battery capacity. Therefore, a power saving issue may not be greatly considered in resource sensing/selection operations for such the terminals. However, in order to perform sidelink communication with terminals having restrictions on battery capacity in the sidelink communication system supporting Release-17 (e.g., a terminal carried by a pedestrian, a terminal mounted on a bicycle, a terminal mounted on a motorcycle, a pedestrian UE (P-UE)), power saving methods will be required. In the present disclosure, a 'V-UE' may refer to a terminal that has no significant restrictions on battery capacity, a 'P-UE' may refer to a terminal with restrictions on battery capacity, and a 'resource sensing/selection operation' may refer to a resource sensing operation and/or a resource selection operation. The resource sensing operation may refer to a partial sensing operation or a full sensing operation. The resource selection operation may refer to a random selection operation. In addition, in the present disclosure, an 'operation of a terminal' may be interpreted as an 'operation of a V-UE' and/or 'operation of a P-UE'.

For power saving in the LTE V2X, a partial sensing operation and/or a random selection operation has been introduced. When the partial sensing operation is supported, the terminal may perform resource sensing operations in partial periods instead of an entire period within a sensing window, and may select a resource based on a result of the partial sensing operation. According to such the operation, power consumption of the terminal may be reduced. When the random selection operation is supported, the terminal may randomly select a resource without performing the resource sensing operation. Alternatively, the random selection operation may be performed together with the resource sensing operation. For example, the terminal may determine resources by performing the resource sensing operation, and may select a resource(s) by performing the random selection operation within the determined resources. In the embodiments, the period may be interpreted as duration or periodicity depending on the context.

In the LTE V2X supporting Release-14, a resource pool in which the partial sensing operation and/or random selection operation can be performed may be configured independently of a resource pool in which the full sensing operation can be performed. A resource pool capable of performing the random selection operation, a resource pool capable of performing the partial sensing operation, and a resource pool capable of performing the full sensing operation may be independently configured. The terminal may select resources by performing the random selection operation, the partial sensing operation, and/or the full sensing operation in the resource pool(s). The terminal may select one operation among the random selection operation and the partial sensing operation, may select a resource(s) by performing the selected sensing operation, and may perform sidelink communication by using the selected resource(s). In the LTE V2X supporting Release-14, sidelink (SL) data may be periodically transmitted based on a broadcast scheme. In the NR communication system, SL data may be transmitted based on a broadcast scheme, multicast scheme, groupcast scheme, or unicast scheme. In addition, in the NR communication system, SL data may be transmitted periodically or aperiodically. A transmitting terminal may transmit SL data to a receiving terminal, and the receiving terminal may transmit a HARQ feedback (e.g., acknowledgement (ACK) or negative ACK (NACK)) for the SL data to the transmitting terminal on a PSFCH. In the present disclosure, a transmitting terminal may refer to a terminal transmitting SL data, and a receiving terminal may refer to a terminal receiving the SL data.

In the present disclosure, methods for improving the partial sensing operation, methods for improving the random selection operation, and methods for power saving will be proposed. By saving power, energy efficiency of the terminal may be increased. As a power saving method for a P-UE, the size of a bandwidth part (BWP) for the P-UE may be set differently from the size of a BWP for a V-UE. The BWP for the P-UE (hereinafter, 'P-BWP') may be configured independently of the BWP for the V-UE (hereinafter, 'V-BWP'). The P-UE may perform the resource sensing operations only in the P-BWP.

The size of the P-BWP may be smaller than the size of the V-BWP. A P-BWP may be configured to be included in a V-BWP. The P-UE may perform a sensing operation within a P-BWP having a relatively small size, and according to this operation, power consumption of the P-UE may be reduced. In a data (e.g., SL data) transmission procedure, the P-UE may perform a resource sensing operation within the P-BWP. In a data reception procedure, data may be received not only in the P-BWP but also in the V-BWP. The P-UE may perform a monitoring operation of control information (e.g., PSCCH, $1^{st}$ sidelink control information (SCI), $2^{nd}$ SCI) within the P-BWP. Even when data transmission is scheduled within the V-BWP (e.g., when data is transmitted within the V-BWP), scheduling information may be preferably transmitted through the P-BWP. The scheduling information may be included in control information (e.g., SCI) transmitted within the P-BWP.

That scheduling information for data transmission in a first BWP (e.g., V-BWP) is transmitted through a second BWP (e.g., P-BWP) may be referred to as a 'cross-BWP scheduling operation'. In order to support the cross-BWP scheduling operation, the control information transmitted in the P-BWP may further include a BWP index as well as the scheduling information (e.g., cross-BWP scheduling information). The BWP index may indicate a BWP (e.g., V-BWP) through which data is transmitted. In addition, the control information may further include slot offset information in consideration of a processing time for performing a BWP switching operation.

Figure 10:
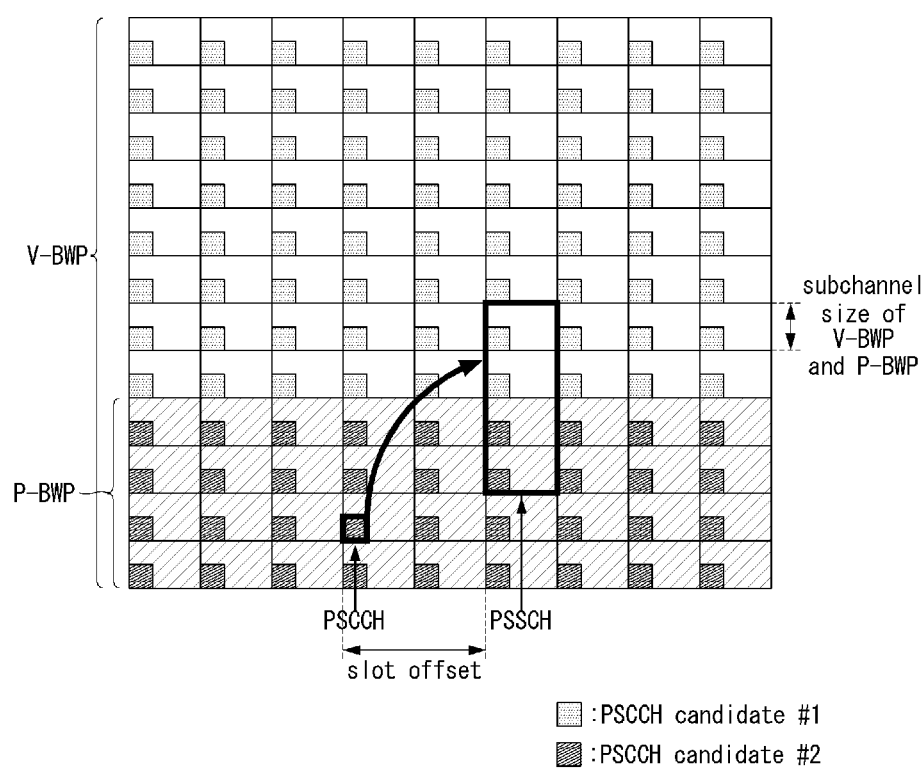
FIG. 10 is a conceptual diagram illustrating a first exemplary embodiment of a method for configuring a BWP in sidelink communication.

FIG. 10 is a conceptual diagram illustrating a first exemplary embodiment of a method for configuring a BWP in sidelink communication.

Referring to FIG. 10, a P-BWP may be configured for P-UEs, and a V-BWP may be configured for V-UEs. The size of the P-BWP may be set differently from the size of the V-BWP. The V-BWP may include the P-BWP. A PSCCH candidate #1 may refer to a PSCCH candidate within the V-BWP, and a PSCCH candidate #2 may refer to a PSCCH candidate belonging to both the V-BWP and the P-BWP. The base station may transmit configuration information of the BWPs (e.g., P-BWP and/or V-BWP) to terminals (e.g., P-UE and/or V-UE). The configuration information of the BWP(s) may be transmitted through at least one of system information, RRC message (e.g., common RRC message and/or UE-specific RRC message), MAC control element (CE), or control information. The P-UE may perform a resource sensing/selection operation for data transmission or a monitoring operation for data reception for PSCCH candidates (e.g., PSCCH candidate #2) within the P-BWP. The V-UE may perform a resource sensing/selection operation for data transmission or a monitoring operation for data reception for all PSCCH candidates (e.g., PSCCH candidate #1 and PSCCH candidate #2) within the V-BWP including the P-BWP.

The P-UE may perform the resource sensing/selection operation or monitoring operation within the P-BWP having a relatively small size, and the V-UE may perform the resource sensing/selection operation or monitoring operation within the V-BWP having a relatively large size. Therefore, the power consumption of the P-UE may be small compared to the power consumption of the V-UE.

In a data transmission procedure, since the region in which the resource sensing/selection operation of the P-UE is performed is limited within the P-BWP, the P-UE may transmit data within the P-BWP. In a data reception procedure, data may be received not only in the P-BWP but also in the V-BWP. That is, data may be received within the V-BWP by BWP switching. In order to support the reception operation of data, a PSCCH (e.g., $1^{st}$ SCI and/or $2^{nd}$ SCI) transmitted within the P-BWP may include a BWP index (e.g., an index indicating BWP switching or the V-BWP). In addition, signaling of a slot offset for a processing time of the BWP switching may be required. The slot offset may be included in the PSCCH transmitted in the P-BWP.

A numerology of a SL BWP may be set to be the same as that of a UL BWP. The SL BWP may include the V-BWP and/or the P-BWP. Alternatively, the numerology of the SL BWP may be set differently from the numerology of the UL BWP. Considering a deactivation operation of the SL BWP, in order to configure and/or operate a plurality of SL BWPs when one UL BWP is activated, it may be preferable that the numerology of the P-BWP is set to be the same as that of the V-BWP. The size of the BWP (e.g., P-BWP, V-BWP) may be set to enable transmission of a separate sidelink SSB (S-SSB) within the corresponding BWP.

Additional control information (e.g., $2^{nd}$ SCI) and/or data may be transmitted in a region other than a region in which the control information is transmitted in subchannel(s). When data (e.g., data channel) is transmitted through another BWP, the additional control information may be additionally transmitted in the subchannel(s) through which the control information (e.g., scheduling information of the data) is transmitted. Alternatively, only the control information may be transmitted without additional control information in the corresponding subchannel(s).

When the size of resources required for transmission of the control information and the additional control information is smaller than the size of a subchannel, the efficiency of resource use may be degraded. In order to improve the efficiency of resource use, the size of the P-BWP (e.g., subchannel of the P-BWP) may be set to be smaller than the size of the V-BWP (e.g., subchannel of the V-BWP). When the size of the P-BWP (e.g., subchannel of the P-BWP) is set to be different from that of the V-BWP (e.g., subchannel of the V-BWP), and the V-BWP includes the P-BWP, a V-UE operating in the V-BWP may perform a resource sensing/selection operation or monitoring operation in a overlapping region between the V-BWP and the P-BWP according to configuration of the P-BWP for coexistence with P-UEs.

Figure 11:
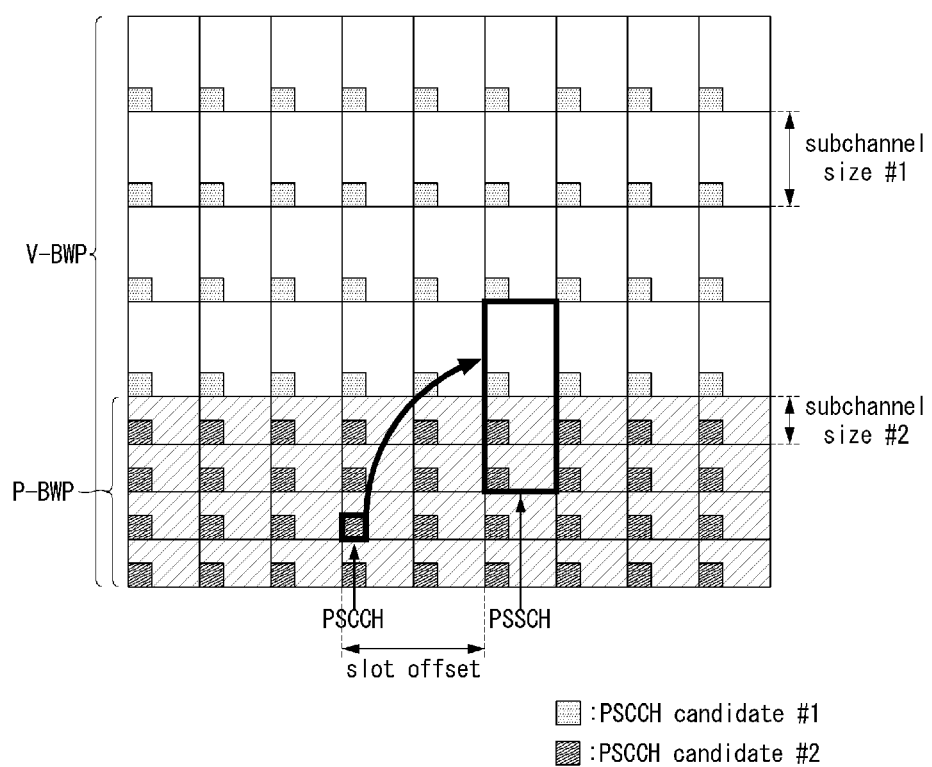
FIG. 11 is a conceptual diagram illustrating a second exemplary embodiment of a method for configuring a BWP in sidelink communication.

FIG. 11 is a conceptual diagram illustrating a second exemplary embodiment of a method for configuring a BWP in sidelink communication.

Referring to FIG. 11, the subchannel size (e.g., subchannel size #2) of the P-BWP may be set differently from the subchannel size (e.g., subchannel size #1) of the V-BWP. The base station may transmit configuration information of the BWPs (e.g., P-BWP and/or V-BWP) to terminals (e.g., P-UE and/or V-UE). The configuration information of the BWPs may be transmitted through at least one of system information, RRC message (e.g., common RRC message and/or UE-specific RRC message), MAC CE, or control information. The P-UE may receive the configuration information of the P-BWP, and may perform a resource sensing/selection operation or monitoring operation only in the PSCCH candidate #2 based on the configuration information. The V-UE may receive the configuration information of the V-BWP, and may perform a resource sensing/selection operation or monitoring operation in both the PSCCH candidates #1 and #2 based on the configuration information.

Although the subchannel size (e.g., subchannel size #2) of the P-BWP is different from the subchannel size (e.g., subchannel size #1) of the V-BWP, the V-UE may know information on the overlapping region between the V-BWP and the P-BWP in advance, and perform the resource sensing/selection operation or monitoring operation in the overlapping region according to the subchannel size #2. When control information transmitted on the PSCCH candidate #2 of the P-BWP schedules a data channel within the V-BWP (i.e., when cross-BWP scheduling operation is performed), the scheduling information of the corresponding data channel may be configured to be suitable to the V-BWP. In the exemplary embodiment shown in FIG. 11, a PSSCH configured (e.g., scheduled) by the PSCCH may include one subchannel belonging to the V-BWP and two subchannels belonging to the P-BWP. Here, the subchannel size #1 may be twice the subchannel size #2. When the PSSCH is configured according to the subchannel size #1, the PSSCH may be interpreted as including two subchannels. In this case, a starting index of the subchannel belonging to the PSSCH may be set based on the subchannel size #1. When a PSSCH is configured according to the subchannel size #1 and a subchannel index starts from 0, a starting index of the subchannel belonging to the PSSCH may be 1. On the other hand, when a PSSCH is configured according to the subchannel size #2 and a subchannel index starts from 0, a starting index of the subchannel belonging to the PSSCH may be 2.

When the V-BWP and P-BWP are configured as in the exemplary embodiments shown in FIGS. 10 and/or 11, the V-UE may perform the resource sensing/selection operation in the entire V-BWP including the overlapping region between the V-BWP and the P-BWP, but the P-UE may perform the resource sensing/selection operation only within the P-BWP. In this case, resource selection of the P-UE may be limited. In consideration of this situation, a resource selection probability of the V-UE within the region of the P-BWP may be set lower than a resource selection probability of the V-UE in a region of [V-BWP-P-BWP]. The region of [V-BWP-P-BWP] may refer to the remaining region of the V-BWP excluding the P-BWP.

The terminal (e.g., V-UE and/or P-UE) may perform the resource sensing operation, may randomly select resources with the same probability from candidate resources that are a result of the resource sensing operation, and may perform sidelink communication by using the selected resources. However, in the resource sensing/selection operation of the V-UE, a resource selection probability (hereinafter, 'resource selection probability #1') applied to a candidate resource (hereinafter, 'candidate resource #1') obtained by the resource sensing operation in the PSCCH candidate #1 may be set differently from a resource selection probability (hereinafter, 'resource selection probability #2') applied to a candidate resource (hereinafter, 'candidate resource #2') obtained by the resource sensing operation in the PSCCH candidate #2. For example, the resource selection probability #1 may be higher than the resource selection probability #2. That is, a probability that the V-UE selects a transmission resource from the candidate resource #1 may be higher than a probability that the V-UE selects a transmission resource from the candidate resource #2. The resource selection probability may be set by the base station, and the base station may transmit information on the resource selection probability by using at least one of system information, RRC message, MAC CE, or control information. The information on the resource selection probability may be included in the above-described configuration information of the BWP(s).

According to the above-described operation, candidate resources within the P-BWP may be configured to be used more by the P-UE than the V-UE, and a conflict probability of resource selection between the V-UE and the P-UE may be reduced. In the above-described exemplary embodiments, the resource regions of the P-UE and the V-UE are configured based on the BWPs, but the above-described exemplary embodiments may be applied identically or similarly to a case where the resource regions of the P-UE and the V-UE are configured based on resource pools. For example, within one BWP (i.e., the same BWP), a resource pool for P-UE(s) (hereinafter, 'P-RP') and a resource pool for V-UE(s) (hereinafter, 'V-RP') may be configured. The P-RP may be configured to correspond to the P-BWP, and the P-BWP based operations may be applied to the P-RP in the same or similar manner. The V-RP may be configured to correspond to the V-BWP, and the V-BWP based operations may be applied to the V-RP in the same or similar manner. In this case, the BWP index may be replaced with an RP index, and the configuration information of the BWP(s) may be replaced with configuration information of the resource pool(s).

A V-RP may be configured to include a P-RP. For example, the P-RP may be configured as a sub-resource pool of the V-RP. In this case, the RP index may not be required. The sub-resource pool may belong to a general resource pool (e.g., V-RP). The sub-resource pool may be interpreted as resources used for a resource sensing/selection operation, monitoring operation, and small data transmission/reception operation of the P-UE. The V-RP may be configured to be distinguished from the P-RP in the time domain, frequency domain, or time-frequency domain. The V-BWP may be configured to be distinguished from the P-BWP in the time domain, frequency domain, or time-frequency domain.

As another method for reducing power consumption of the terminal, when the mode 2 is used for sidelink resource allocation, a terminal that performs a resource coordination operation for data transmission and reception between terminals (hereinafter referred to as 'coordination (C)-UE') may be configured, and the C-UE may inform terminals performing sidelink communication of resource coordination information (e.g., information on coordinated resources). The terminals may perform sidelink communication by using resource(s) within the resources coordinated by the C-UE. According to the above-described operations, a conflict probability of resource selection between the terminals may be reduced, and thus the performance of the sidelink communication may be improved. Since the resource sensing/selection operations are performed within limited resources (e.g., resources coordinated by the C-UE), energy efficiency of the terminal may be improved.

When the mode 2 is used, the terminal may perform the resource sensing operation during a sensing window (e.g., sensing period), and based on a result of the resource sensing operation, the terminal may select resource(s) within a selection window (e.g., selection period). Before actual data transmission, the terminal may additionally identify whether the selected resource(s) is used for aperiodic data transmission and/or high priority data transmission by performing a re-evaluation operation. That is, pre-empted resource(s) may be identified by the re-evaluation operation. When the selected resource(s) is used for aperiodic data transmission and/or transmission of data having a high priority (e.g., when a resource selection conflict is predicted to occur), the terminal may perform a resource reselection operation to select resource(s) other than the selected resource(s).

As a method proposed in the present disclosure, the C-UE may select resource(s) by performing a resource sensing/selection operation, and may transmit information of the selected resource(s) to the terminal(s), and the terminal(s) may perform a re-evaluation operation on the resource(s) selected by the C-UE before actual data transmission without performing a resource sensing/selection operation. If a resource selection conflict is expected to occur according to the re-evaluation operation, candidate resources for the resource re-selection operation may be required. In order to support this operation, a resource sensing operation may be required. Accordingly, the C-UE may transmit information on the candidate resources for the resource reselection operation as well as information on resources selected by the resource sensing/selection operation to the terminal (e.g., transmitting terminal). A time-frequency resource (or channel) through which the information of the selected resources is transmitted may be configured differently from a time-frequency resource (or channel) through which the information of the candidate resources is transmitted. The transmitting terminal may perform the re-evaluation operation on the resources selected by the C-UE, may reselect new resource(s) from the candidate resources when a conflict of the selected resources is expected, and may transmit data to the receiving terminal by using the reselected resource(s).

In the LTE V2X supporting Release-14, the partial sensing operation and/or random selection operation has been introduced for the P-UE requiring power saving due to battery capacity restrictions. When the partial sensing operation is performed, a transmitting terminal may perform the sensing operation in some slots within a sensing window. The partial sensing operation may be used for periodic data transmission/reception. The terminal may randomly select candidate slots in consideration of the preset minimum number of slots within a resource selection period (e.g., resource selection window, sensing window) defined in the LTE V2X supporting Release-14, and may perform the partial sensing operation based on the selected candidate slots according to a periodicity of k×100 ms. The base station may inform the terminal of a value of k. The value of k may be signaled by a bitmap, and the bitmap may consist of 10 bits. The value of k may be determined according to a position of a corresponding bit having a specific value in the bitmap. For example, bits included in the bitmap may correspond to 1 to 10 in the order of 'most significant bit (MSB)→least significant bit (LSB)'. For example, the first bit in the bitmap may indicate 1 (i.e., k=1), the second bit in the bitmap may indicate 2 (i.e., k=2), and the tenth bit in the bitmap may indicate 10 (i.e., k=10).

The terminal may determine a value corresponding to a bit set to '1' in the bitmap as the value of k, and may determine (e.g., set) a periodicity of the partial sensing operation based on k. When the MSB of the bitmap is set to '1', a periodicity of the partial sensing operation may be 100 ms (i.e., 1×100 ms). When the second MSB of the bitmap is set to '1', a periodicity of the partial sensing operation may be 200 ms (i.e., 2×100 ms). When the LSB of the bitmap is set to '1', a periodicity of the partial sensing operation may be 1000 ms (i.e., 10×100 ms). The terminal may perform the partial sensing operation according to the determined periodicities. In the LTE V2X supporting Release-14, the terminal may perform a sensing operation not only according to a periodicity in units of 100 ms, but also according to a periodicity in units of 20 ms or 50 ms. However, in the resource pool for P-UE(s), a partial sensing operation according to a periodicity in units of 20 ms or 50 ms may not be supported.

On the other hand, in the NR communication system, periodicities {1 ms, 2 ms, . . . , 99 ms} as well as periodicities {0, 100 ms, 200 ms, . . . , 1000 ms} may be supported. Among the above-described periodicities, n periodicities may be selected for a resource pool in advance, and the n periodicities may be preconfigured. The maximum value of n may be 16. The base station may transmit information of the n periodicities to the terminal. Information of the n periodicities may be included in configuration information of the resource pool. The information of the n periodicities may be transmitted by using at least one of system information, RRC message (e.g., common RRC message and/or UE-specific RRC message), MAC CE, or control information.

The terminal may identify the n periodicities based on the information received from the base station. The terminal may select one periodicity among the n periodicities, and may perform a resource sensing operation (e.g., partial sensing operation) according to the selected periodicity. Unlike the LTE communication system, various resource sensing/selection operations may coexist in the NR communication system. The partial sensing operation may be required for data transmission having a shorter periodicity. For each resource pool, n (e.g., 16) periodicities may be preset, and the terminal may perform the partial sensing operation for data transmission (e.g., periodic data transmission) in consideration of all of the n periodicities. Alternatively, the terminal may perform the partial sensing operation for data transmission (e.g., periodic data transmission) in consideration of some of the n periodicities.

The terminal may preferentially exclude a short periodicity from the n periodicities set by the base station. For example, since a transmission operation according to a periodicity of 1 ms may be the same as a continuous transmission operation, the periodicity of 1 ms may be excluded from the periodicities to be used by the terminal for power saving. By comparing a power consumption according to the partial sensing operation and a power consumption according to the full sensing operation, short periodicities other than the periodicity of 1 ms may be further excluded from the periodicities to be used by the terminal. For the above-described operation, a periodicity threshold may be set. Partial sensing operations according to periodicities less than the periodicity threshold may not be performed, and partial sensing operations according to periodicities greater than or equal to the periodicity threshold may be performed. For example, the terminal may perform the partial sensing operations on resources according to periodicities equal to or greater than the periodicity threshold. The base station may set the periodicity threshold, and inform the periodicity threshold to the terminal by using at least one of system information, RRC message (e.g., common RRC message and/or UE-specific RRC message), MAC CE, or control information. The periodicity threshold may be set together with the periodicities applied to the resource pool. If the periodicity threshold is not set, the terminal may perform partial sensing operations by using all periodicities applied to the resource pool.

The partial sensing operation according to periodicities less than the periodicity threshold may not be performed, and a continuous sensing window (e.g., continuous sensing period) having a predetermined length may be configured to compensate for such the problem. The resource sensing operation (e.g., partial sensing operation) may be performed in the continuous sensing window. In this case, the length of the continuous sensing window may be set to be greater than or equal to the length corresponding to the periodicity threshold. When the partial sensing operation according to periodicities greater than or equal to the periodicity threshold and one periodicity among the periodicities is a divisor of another periodicity, the partial sensing operation may be performed in consideration of only the one periodicity that is a divisor of another periodicity. According to this operation, power consumption of the terminal may be reduced. For example, when the periodicities are set to 200 ms, 400 ms, and 500 ms, 200 ms is a divisor of 400 ms, so the terminal may not perform a partial sensing operation according to the periodicity of 400 ms, and may perform a partial sensing operation according to the periodicity of 200 ms and a partial sensing operation according to the periodicity of 500 ms.

The terminal may perform the sensing operation (e.g., partial sensing operation) in consideration of only a subset of n periodicities set by the base station. For example, the base station may configure a subset including r periodicities among the n periodicities, and may transmit configuration information of the subset to the terminal. Here, the base station may transmit the configuration information of the subset to the terminal by using at least one of system information, RRC message (e.g., common RRC message and/or UE-specific RRC message), MAC CE, or control information. r may be a natural number less than or equal to n.

The terminal may receive the configuration information of the subset from the base station. The terminal may perform the sensing operation in consideration of only the periodicities belonging to the subset. For example, the terminal may not perform a partial sensing operation according to a periodicity not included in the subset, and may perform a partial sensing operation according to a periodicity included in the subset. The subset including r periodicities may be configured together with the periodicities (e.g., n periodicities) applied to the resource pool. If the subset is not configured, the terminal may perform the partial sensing operation by using all periodicities applied to the resource pool.

Unlike the LTE sidelink communication, an operation of transmitting and receiving aperiodic data in the NR sidelink communication may be supported. A partial sensing operation for the aperiodic data transmission/reception operation may be required. The terminal may not be able to predict a transmission timing of aperiodic data. Therefore, when a full sensing operation is used, the terminal may perform the resource sensing operation in all slots excluding slot(s) used for sidelink communication of the corresponding terminal within the sensing window, and may select resource (s) based on a result of the resource sensing operation. However, considering power consumption of the P-UE, the P-UE may not perform the resource sensing operation in all slots within the sensing window. Since it is not periodic data transmission, even if the resource sensing operation is performed only for some slots, a great effect may not occur.

Therefore, when aperiodic data transmission is required, the P-UE may select candidate resource(s) for data transmission by performing a random selection operation, and may reselect suitable resource(s) by performing an additional resource sensing operation before actual data transmission. In the sidelink communication, selection and signaling for up to three resources (e.g., up to 3 slots) may be performed within 32 slots. A random selection operation considering this operation will be proposed. For aperiodic data transmission, the terminal may select candidate resource(s) for data transmission by performing a random selection operation. In this case, the first position of the candidate resource(s) may be preferably determined (e.g., selected) in consideration of a 'packet delay budget (PDB)' and 32 slots for which resource selection and signaling are possible. For example, when the random selection operation is performed in the slot #n, the terminal may determine the first position of the candidate resource(s) between the slot #(n+Toffset) and the slot #(k−31) located before the PDB. The slot #(k−31) may be determined in consideration of the slot #k before the PDB and 32 slots.

Figure 12:
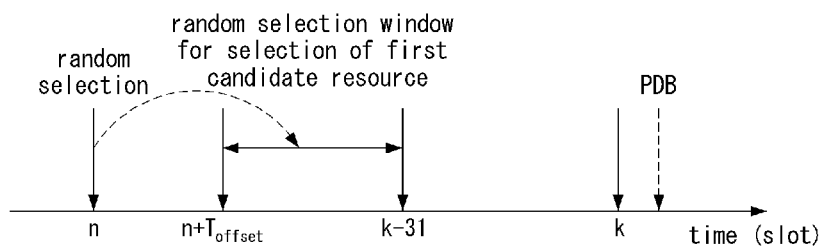
FIG. 12 is a conceptual diagram illustrating a first exemplary embodiment of a resource selection operation based on a random selection window.

FIG. 12 is a conceptual diagram illustrating a first exemplary embodiment of a resource selection operation based on a random selection window.

Referring to FIG. 12, a terminal (e.g., transmitting terminal, V-UE or P-UE) may perform a random selection operation in the slot #n. A plurality of candidate resources may be determined by the random selection operation. The terminal may select resource(s) used for data transmission among the plurality of candidate resources. A first resource among the candidate resources may be selected within a random selection window. The terminal may perform sidelink communication by using the first resource. Thereafter, the terminal may identify resources for sidelink communication based on the first resource and a preset periodicity, and may perform sidelink communication in the respective periods according to the preset periodicity by using the identified resources.

The random selection window may be configured between the slot #(n+$T_{offset}$) and the slot #(k−31). That is, a starting slot of the random selection window may be the slot #(n+$T_{offset}$), and an ending slot of the random selection window may be the slot #(k−31). The slot #(n+$T_{offset}$) may be a slot after a time offset (i.e., $T_{offset}$) from the slot #n in which the random selection operation is performed. The slot #(k−31) may be a slot determined by considering 32 slots based on the slot #k that satisfies the PDB.

The base station may set the time offset, and may transmit, to the terminal, the information of the time offset by using at least one of system information, RRC message (e.g., common RRC message and/or UE-specific RRC message), MAC CE, or control information. Alternatively, the time offset may be predefined in the technical specification. Alternatively, a plurality of time offsets may be set based on data priorities, usage scenarios, and/or latency requirements. The base station may transmit information of the plurality of time offsets to the terminal by using at least one of system information, RRC message (e.g., common RRC message and/or UE-specific RRC message), MAC CE, or control information. Alternatively, the plurality of time offsets may be predefined in the technical specification. The base station may inform the terminal of one time offset among the plurality of time offsets. The terminal may identify the slot #(n+$T_{offset}$) based on the time offset indicated by the base station or a time offset determined according to a preset criterion among the plurality of time offsets.

When the time offset is 1, the random selection window may start from the next slot (i.e., slot #(n+1)) of the slot #n in which the random selection operation is performed. The slot #k may be a slot closest to the PDB among slot(s) satisfying the PDB, a random slot among the slot(s) satisfying the PDB, or a slot to which a preset offset is applied to the PDB. The base station may transmit information on the slot #k (e.g., the selection criterion of the slot #k (e.g., the slot closest to the PDB or random slot), the offset, and the value of k) to the terminal by using at least one system information, RRC message, MAC CE, or control information. The terminal may determine the slot #k based on the information received from the base station. Alternatively, the information on the slot #k may be predefined in the technical specification. In this case, the terminal may determine the slot #k based on predefined information. When the slot #k is determined, the terminal may determine the slot #(k−31), which is the ending time point of the random selection window, in consideration of 32 slots.

Alternatively, the random selection window may be configured based on two time offsets (e.g., $T_{offset}$ and $T_{offset2}$). That is, $T_{offset2}$ may be additionally used. In this case, the slot #(n+$T_{offset}$) may be the starting slot of the random selection window, and the slot #(n+$T_{offset2}$) may be the ending slot of the random selection window. The terminal may select the first resource within the random selection window (e.g., resources between the slot #(n+$T_{offset}$) and the slot #(n+$T_{offset2}$))

The base station may set one or more $T_{offset2}$(s), and transmit information on the one or more $T_{offset2}$(s) to the terminal by using at least one of system information, RRC message (e.g., common RRC message and/or UE-specific RRC message), MAC CE, or control information. The one or more $T_{offset2}$(s) may be set in consideration of data priorities, usage scenarios, and/or latency requirements. Alternatively, the one or more $T_{offset2}$(s) may be predefined in the technical specification. When a plurality of $T_{offset2}$(s) are configured, the base station may inform the terminal of information on one $T_{offset2}$ among the plurality of $T_{offset2}$(s). The terminal may use the one $T_{offset2}$ indicated by the base station among the plurality of $T_{offset2}$(s) or one $T_{offset2}$ selected according to a specific criterion among the plurality of $T_{offset2}$(s).

Figure 13:
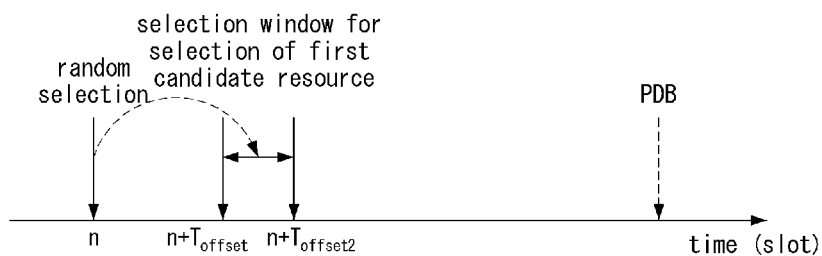
FIG. 13 is a conceptual diagram illustrating a second exemplary embodiment of a resource selection operation based on a random selection window.

FIG. 13 is a conceptual diagram illustrating a second exemplary embodiment of a resource selection operation based on a random selection window.

Referring to FIG. 13, a terminal (e.g., transmitting terminal, V-UE or P-UE) may perform a random selection operation in the slot #n. A plurality of candidate resources may be determined by the random selection operation. The terminal may select resource(s) used for data transmission among the plurality of candidate resources. A first resource among the candidate resources may be selected within a random selection window. The terminal may perform sidelink communication by using the first resource. Thereafter, the terminal may identify resources for sidelink communication based on the first resource and a preset periodicity, and may perform sidelink communication in the respective periods according to the preset periodicity by using the identified resources.

$T_{offset2}$ may be additionally set, and the random selection window for selection of the first resource among candidate resources may be configured by two time offsets (e.g., $T_{offset}$ and $T_{offset2}$). In this case, the slot #(n+$T_{offset}$) may be the starting slot of the random selection window, and the slot #(n+$T_{offset2}$) may be the ending slot of the random selection window. In order to satisfy the low latency requirement, the length of the random selection window may be set to be short. According to this operation, an earlier resource in the time domain among the candidate resources may be selected as the first resource. Accordingly, data transmission latency may be reduced.

A window duration may be set instead of $T_{offset2}$. The window duration may indicate the length of the random selection window. The base station may transmit information of the window duration to the terminal by using at least one of system information, RRC message, MAC CE, and control information. The terminal may identify the random selection window based on $T_{offset}$ and the window duration.

When a plurality of resources are required for data transmission, up to two resources may be additionally selected within 32 slots based on the first resource selected within the random selection window. In this case, the terminal may select a total of three resources. Alternatively, the random selection window may be used to select not one resource but a plurality of resources. In order to support this operation, the random selection window may be configured to be larger than the random selection window shown in FIG. 12 or the random selection window shown in FIG. 13. However, a probability of conflict between the resources selected by the random selection operation and resources of other terminals may be high. In order to reduce the probability of resource conflict, the terminal may additionally perform a resource sensing operation on the selected resources before actual data transmission, and when conflict occurrence is expected in the selected resources as a result of performing the resource sensing operation, the terminal may perform a resource reselection operation.

A period in which the resource sensing operation is performed after the random selection operation is performed may be a period from the slot #(n+1) to the slot #(m−$T_3$) after the selection of the candidate resource. m may be a natural number less than or equal to k. The slot #m may be a slot in which the last transmission of the data occurs. The slot #(m−$T_3$) may be set based on the slot #m. If the slot #m is not suitable for data transmission, data transmission in the slot #m may be canceled, and $T_3$ may be a time required for preparation of data transmission in the reselected resource. The base station may transmit information of $T_3$ to the terminal by using at least one of system information, RRC message, MAC CE, and control information. Alternatively, $T_3$ may be predefined in the technical specification. In order to transmit a HARQ feedback for the data on a PSFCH, the terminal may select a resource by performing a random selection operation. In this case, the resource may be selected in consideration of a time between a PSSCH and the PSFCH. When the PSFCH (e.g., HARQ feedback) for a PSSCH is received after transmission of the PSSCH (e.g., data), a resource after a predetermined time required for data retransmission may be selected.

Alternatively, the resource selection operation may be triggered in the slot #n. In this case, the terminal may perform a continuous resource sensing operation instead of the random selection operation for a preset time period from the slot #n, and may select a resource based on a result of the continuous resource sensing operation. The time period configured based on the slot #n may be a time period after the slot #n or a time period before the slot #n. That the time period before the slot #n is configured may mean that the terminal performs a resource sensing operation. In exemplary embodiments, the time period may refer to a time window. That is, the period may be interpreted as a window.

For a resource sensing operation for aperiodic data transmission, a time period after the slot #n may be configured. For a resource sensing operation for data transmission having a short periodicity, a time period including a time before the slot #n and a time after the slot #n may be configured. In this case, the starting time of the time period may be set in consideration of a threshold for determining whether a periodicity of data transmission is short or not. When the length of the time period is set to 0, the terminal may select a resource by performing a random selection operation without performing a resource sensing operation. The time period may be configured in consideration of a data priority, usage scenario, latency requirement, and/or PDB of data.

The base station may configure a plurality of time periods, and may transmit information of the plurality of time periods to the terminal by using at least one of system information, RRC message, MAC CE, or control information. In addition, the base station may transmit information indicating one time period among the plurality of time periods to the terminal by using at least one of system information, RRC message, MAC CE, or control information. The terminal may use the one time period indicated by the base station among the plurality of time periods. Alternatively, the terminal may select one time period among the plurality of time periods according to a specific criterion. A resource selection period (e.g., resource selection window) for selection of a first resource may be configured according to a data priority, usage scenario, and/or latency requirements. The terminal may select the first resource within the resource selection period.

Figure 14A:
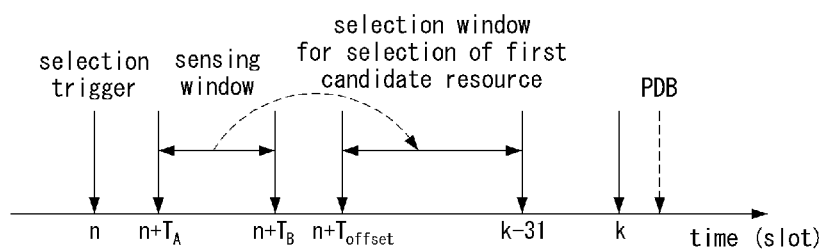
FIG. 14A is a conceptual diagram illustrating a first exemplary embodiment of a resource selection operation based on a selection window.
Figure 14B:
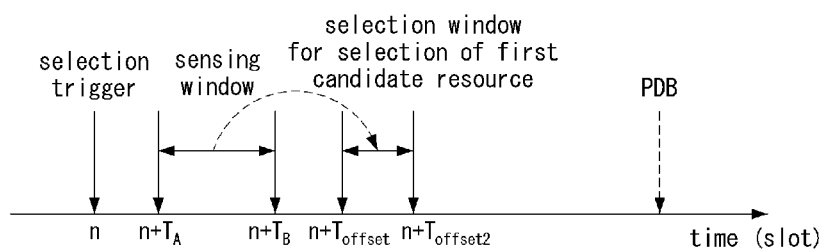
FIG. 14B is a conceptual diagram illustrating a second exemplary embodiment of a resource selection operation based on a selection window.

FIG. 14A is a conceptual diagram illustrating a first exemplary embodiment of a resource selection operation based on a selection window, and FIG. 14B is a conceptual diagram illustrating a second exemplary embodiment of a resource selection operation based on a selection window.

Referring to FIGS. 14A and 14B, a resource selection period (e.g., selection window) for selecting a first resource may be configured based on a resource sensing operation. In the exemplary embodiment shown in FIG. 14A, the terminal may perform a resource sensing operation in the resource sensing period (e.g., sensing window), and may select a first resource based on a result of the resource sensing operation. Here, the first resource may be selected within the resource selection period (e.g., selection window) from the slot #(n+$T_{offset}$) to the slot #(k−31). The starting slot (i.e., slot #(n+$T_{offset}$)) of the resource selection period may be set in consideration of the slot #n and the time offset (i.e., $T_{offset}$).

The ending slot (i.e., slot #(k−31)) of the resource selection period may be set in consideration of the slot #k that satisfies the PDB and 32 slots.

In the exemplary embodiment shown in FIG. 14B, the terminal may perform a resource sensing operation in the resource sensing period (e.g., sensing window), and may select a first resource based on a result of the resource sensing operation. Here, the first resource may be selected within a resource selection period (e.g., selection window) from the slot #(n+$T_{offset}$) to the slot #(n+$T_{offset2}$). The starting slot (i.e., slot #(n+$T_{offset}$)) of the resource selection period may be set in consideration of the slot #n and $T_{offset}$. The ending slot (i.e., slot #(n+$T_{offset2}$)) of the resource selection period may be set in consideration of the slot #n and $T_{offset2}$.

$T_A$ and $T_B$ may be used to set a time period (e.g., sensing window) for resource sensing. Each of $T_A$ and $T_B$ may have a positive value. Alternatively, each of $T_A$ and $T_B$ may have a negative value. A partial sensing operation for periodic data transmission may be performed. The resource sensing operation (e.g., partial sensing operation) may be performed periodically in consideration of periodicities greater than or equal to a specific threshold based on candidate slots included in the resource selection period. In order to consider periodicities less than the specific threshold, continuous sensing periods may be configured. In this case, $T_A$ may be set as a result of (the first candidate slot among candidate slots belonging to the resource selection period—the specific threshold). Alternatively, $T_A$ may be set in consideration of the maximum periodicity among periodicities less than the specific threshold. $T_B$ may be determined as the first candidate slot among candidate slots belonging to the resource selection period. Alternatively, $T_B$ may be set in consideration of the minimum periodicity among periodicities less than the specific threshold based on the first candidate slot among the candidate slots belonging to the resource selection period.

Alternatively, the application criterion of $T_A$ and $T_B$ may be the starting time (e.g., slot #(n+$T_{offset}$)) of the resource selection period instead of the first candidate slot among the candidate slots. According to the method of configuring the application criterion of $T_A$ and $T_B$, at least one of $T_A$ and $T_B$ may be set to a negative value. When the resource sensing period is configured based on the first slot (e.g., the first candidate slot) of the resource selection period, the resource sensing period may be configured after the triggering time of the resource selection operation. In this case, the terminal may select a resource by performing a random selection operation at the triggering time, and thereafter may perform an additional resource sensing operation or re-evaluation operation. That is, the terminal may determine whether resource reselection is necessary by performing the re-evaluation operation.

In an aperiodic data transmission procedure, a data transmission timing may not be predicted. Therefore, after the resource selection operation is triggered, the terminal may perform a resource sensing operation before the actual resource selection period. In this case, both $T_A$ and $T_B$ may be set to positive values. When a time from the triggering time of the resource selection operation to the actual resource selection period is not sufficient, the terminal may not be able to perform the resource sensing operation. In this case, $T_A$ and $T_B$ may be set to the same value (e.g., 0). Accordingly, the terminal may consider that the length of the resource sensing period is set to 0, and may perform a random selection operation.

Figure 15:
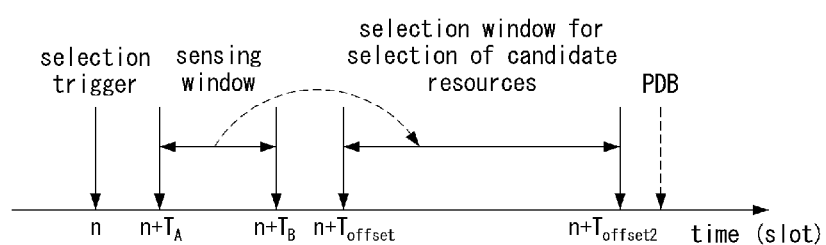
FIG. 15 is a conceptual diagram illustrating a third exemplary embodiment of a resource selection operation based on a selection window.

FIG. 15 is a conceptual diagram illustrating a third exemplary embodiment of a resource selection operation based on a selection window.

Referring to FIG. 15, a resource selection period after a resource sensing operation may be used for selection of a plurality of resources (e.g., all resources) rather than only a first resource. For example, in the exemplary embodiment shown in FIG. 14A, the resource selection period for selection of all resources may be configured between the slot #(n+$T_{offset}$) and the slot #k. Alternatively, the resource selection period for selection of all resources may be configured as a period from the slot #(n+$T_{offset}$) to the slot #(n+$T_{offset2}$).

The terminal may perform the resource sensing operation for periodic data transmission. In this case, the terminal may perform a resource selection operation by additionally considering a result of the existing resource sensing operation. When the length of the time period (e.g., resource sensing period) is set to 0 and a random selection operation is performed, the terminal may select a resource based on the result of the existing resource sensing operation. The result of the existing resource sensing operation may be a result of the resource sensing operation performed in a resource sensing period before the time period having a length of 0. When a HARQ feedback transmission operation through a PSFCH is performed, the terminal may select a resource by performing a random selection operation. In this case, the terminal may select the resource in consideration of a time interval between a PSSCH and the PSFCH.

When the random selection operation is performed for periodic data transmission (e.g., data transmission according to a specific periodicity), the terminal may reserve resources by applying the specific periodicity to the resource(s) selected by the random selection operation. When the specific resource(s) are periodically reserved in sidelink communication, the terminal may apply a separate resource reselection counter. In exemplary embodiments, the counter may refer to a resource reselection counter. For example, the terminal may decrement the counter value by one every time one period passes. When the counter value becomes 1, the terminal may perform the following operation. If a probability value randomly selected between [0, 1] according to the uniform probability through a MAC entity is less than or equal to a specific probability value set through RRC, and the counter value becomes 0, the terminal may reset the counter to a value randomly selected between specific values according to the uniform probability.

In order to periodically reserve the resources selected by the random selection operation, the above-described method may be equally applied. However, the conflict probability of randomly selected resources without performing the resource sensing operation may be higher than the conflict probability of the resources selected after the resource sensing operation is performed. When resources in which conflicts occur are reserved according to the same periodicity, the resource conflicts may occur continuously. In order to solve such the problem, when resource conflicts occur continuously, the terminal may release the reserved resources even before the counter value becomes 0, and may select a new resource(s) by performing a random selection operation. In this case, the previous counter value or an initial value of the previous counter may be used as the counter value. Alternatively, a new counter value may be set by the above-described method of setting the counter value, and the terminal may use the new counter value. In this case, the condition that the probability value randomly selected between [0, 1] according to the uniform probability through a MAC entity is less than or equal to a specific probability value set through RRC signaling may not be applied.

A terminal capable of receiving a PSFCH may perform a PSFCH monitoring operation, and when the number of NACKs (e.g., consecutive NACKs) received by the PSFCH monitoring operation is equal to or greater than a threshold, the terminal may determine that continuous resource conflicts occur. Here, the threshold may be set to the terminal by the base station. If it is determined that continuous resource conflicts occur, the terminal may select a new resource(s) by performing a random selection operation even when the counter value does not reach 0.

Alternatively, the receiving terminal may determine that the continuous resource conflicts occur, and may transmit to the transmitting terminal an indicator indicating that the continuous resource conflicts occur. Alternatively, the receiving terminal may continuously transmit an indicator indicating that a resource conflict occurs to the transmitting terminal. The transmitting terminal may determine that the continuous resource conflicts occur based on the indicator(s) received from the receiving terminal. The indicator for notifying the occurrence of continuous resource conflicts may be designed in a form similar to a PSFCH. A transmission resource of the indicator may be implicitly indicated according to information (e.g., identifier) of the receiving terminal or the transmitting terminal or a transmission position of the data. Alternatively, the transmission resource of the indicator may be explicitly indicated by control information (e.g., SCI or RRC message).

The transmitting terminal may perform a monitoring operation on the transmission resource of the indicator after data transmission. When the indicator(s) are received from the receiving terminal, the transmitting terminal may determine that the continuous resource conflicts occur. In this case, even when the counter value does not reach 0, the transmitting terminal may select a new resource(s) by performing a random selection operation again.

As another method for preventing continuous resource conflicts, the terminal (e.g., transmitting terminal) may select resource(s) (e.g., first resource(s)) by performing a random selection operation, may reserve a new resource(s) by applying an offset to the initially-selected resource(s) (e.g., first resource(s)), and perform sidelink communication by using the reserved resource(s). In this case, even when a conflict occurs in some or all of the resource(s) selected by the random selection operation in a period #n, the terminal may use resource(s) obtained by applying an offset to resource(s) of the previous period #n in the next period #(n+1), and thus continuous resource conflicts may not occur. The base station may transmit information on the offset applied to the selected resource(s) to the terminal by using at least one of system information, RRC message (e.g., common RRC message and/or UE-specific RRC message), MAC CE, or control information. Here, the base station may set the same offset to all of the plurality of resources. Alternatively, the base station may set different offsets for each of the plurality of resources. The terminal may select the first resource(s) by performing a random selection operation, and may perform sidelink communication by using the first resource(s). The terminal may determine (e.g., select or reserve) resource(s) (e.g., the second resource(s)) by applying an offset to the first resource(s) in the next period (e.g., the first period), and may perform sidelink communication by using the determined resource(s).

When a conflict occurs between resources selected by random selection operations performed by two terminals and the same offset is applied, continuous resource conflicts may occur. The offset applied to the selected resource(s) may be set differently for each terminal. For example, the base station may transmit a UE-specific RRC message including the offset to the terminal. Alternatively, the offset may be obtained by substituting a terminal ID into a specific function. For example, a communication node (e.g., base station, transmitting terminal, or receiving terminal) may obtain a specific value by applying a modulo operation to a transmitting terminal ID and/or a receiving terminal ID, and use the specific value as an offset applied to the selected resource(s). The specific function (e.g., modular operation) for calculating the offset may be predefined in the technical specification. Alternatively, the base station may inform the terminal of information on a plurality of offsets. The terminal may select one offset among the plurality of offsets, and may determine a resource by applying the selected offset to the selected resource(s).

The transmitting terminal may reserve periodic resources by additionally considering the offset as well as a resource reselection counter value of a resource reservation period and/or a terminal ID. In exemplary embodiments, the counter may refer to a resource reselection counter. For example, the transmitting terminal may reserve (e.g., select or reselect) resource(s) by applying a result of the offset×the counter value (e.g., the remaining counter value) in resource reservation period to the selected resource (e.g., the first resource) for each period, and may perform sidelink communication by using the reserved resource(s). When the resource(s) are reserved by applying the offset, all or part of the reserved resource(s) may be out of the resource pool (e.g., the resource pool configured in the transmitting terminal). In order to prevent such the problem, the transmitting terminal may additionally apply a modulo operation. In this case, the number of subchannels within the resource pool may be used as a divisor of the modular operation. When a plurality of subchannels are reserved, a modulo operation may be used in consideration of the number of subchannels and the number of subchannels for the reserved resource(s). For example, the value (the total number of subchannels within the resource pool−the number of subchannels for the reserved resource(s)+1) may be used as a divisor of the modulo operation.

Meanwhile, the P-UE may perform a power saving operation due to the limitation of the battery capacity. By this operation, energy efficiency of the P-UE may be improved. The P-UE may select a resource(s) by performing the partial sensing operation and/or random selection operation. On the other hand, the V-UE may select a resource(s) by performing the full sensing operation. A resource(s) selected by the V-UE (or P-UE) may be pre-empted by transmission of another terminal having a higher priority. The V-UE may predict occurrence of a conflict in the selected resource(s) by performing a re-evaluation operation. For example, the pre-empted resource may be identified by the re-evaluation operation. In this case, the V-UE may drop data (e.g., SL data) to be transmitted in the selected resource, and may perform a resource selection operation again for retransmission of the dropped data.

When the transmission of data is dropped by the pre-emption and re-evaluation operation, and the resource sensing/selection operation for retransmission of the dropped data is performed again, power consumption of the terminal (e.g., P-UE or V-UE) may be increased. For the power saving operation of the P-UE, methods for preventing the resource reselection operation due to the pre-emption and/or re-evaluation operation for the resource(s) will be proposed.

A first terminal (e.g., P-UE) may select a resource(s) by performing the random selection operation and/or the partial sensing operation. A second terminal (e.g., V-UE) may perform the full sensing operation for resource selection. When it is identified that a resource(s) identified by the full sensing operation of the second terminal is the same as a resource(s) selected by the random selection operation and/or partial sensing operation of the first terminal, the second terminal may not perform a pre-emption operation on the resource(s). The priority of the resource selected by the first terminal may be set to be higher than the priority of the resource selected by the second terminal. Accordingly, the first terminal may reliably transmit data without interference or pre-emption from the second terminal. The power consumption for the resource reselection operation and the power consumption for the data retransmission operation in the first terminal may be reduced.

In order to support the above-described operations, the first terminal may select a resource(s) by performing the partial sensing operation and/or random selection operation, and may transmit control information (e.g., $1^{st}$ SCI and/or $2^{nd}$ SCI) including an indicator for preventing the selected resource(s) from being used by another terminal (e.g., second terminal). The indicator may indicate information distinguishing the first terminal from the second terminal, an identifier of the first terminal, or information indicating that the selected resource(s) is used by the first terminal. Upon receiving the indicator from the first terminal, the second terminal may perform a resource selection operation in the remaining resources excluding the resource(s) indicated by the indicator among all resources (e.g., all candidate resources). In order to identify the control information including the indicator for excluding the resource(s) selected by the first terminal in the resource selection operation, each of the first terminal and the second terminal may apply a scrambling sequence (e.g., radio network temporary identifier (RNTI)) of a PSCCH (e.g., $1^{st}$ SCI) or a PSCCH demodulation-reference signal (DM-RS) sequence differently.

Alternatively, the priority of the data of the first terminal (e.g., P-UE) may be set to be the highest regardless of the actual priority. Alternatively, the priority of the data of the first terminal may be set above a preset reference. In this case, the resource for data transmission of the first terminal may be prevented from being pre-empted by another terminal. An additional offset may be applied for selection of a PSFCH resource for the data received from the first terminal. In this case, the PSFCH resource may be selected by additionally applying the corresponding indicator.

As another method for power saving, a method of reducing the number of times of monitoring SCI in the terminal performing the resource sensing operation may be used. In a data reception procedure, the terminal may identify information included in the 1st SCI by decoding the PSCCH, may obtain the $2^{nd}$ SCI based on the identified information, may identify a source ID and a destination ID included in the $2^{nd}$ SCI, and may identify whether data scheduled by the $1^{st}$ SCI is data for itself based on the ID(s). When the data scheduled by the $1^{st}$ SCI is data for the terminal itself, the terminal may receive the data through a PSSCH.

The terminal performing the resource sensing operation may obtain the $1^{st}$ SCI through the PSCCH, may obtain the $2^{nd}$ SCI based on the information included in $1^{st}$ SCI, and then may perform a measurement operation of a reference signal received power (RSRP). The terminal may identify a receiver of the data scheduled by the $1^{st}$ SCI associated with the $2^{nd}$ SCI based on the source ID and the destination ID included in the $2^{nd}$ SCI. When the identified receiver is the terminal itself, the terminal may perform a data reception operation. When the identified receiver is another terminal, the terminal may perform a resource sensing operation. That is, the terminal may perform a decoding operation for both the $1^{st}$ SCI and the $2^{nd}$ SCI to determine its subsequent operation (e.g., data reception operation or resource sensing operation).

When the source ID and/or destination ID are included in $1^{st}$ SCI instead of the $2^{nd}$ SCI, the terminal may determine its subsequent operations (e.g., data reception operation or resource sensing operation) by performing a decoding operation for only the 1st SCI. According to such the operation, power consumption of the terminal may be reduced. Alternatively, information indicating subsequent operations of the terminal may be signaled.

Alternatively, the ID (e.g., ID format) of the P-UE may be set differently from the ID (e.g., ID format) of the V-UE. Information indicating that the IDs (e.g., ID formats) of the P-UE and the V-UE are different may be signaled. The PSCCH format of the P-UE may be configured differently from the PSCCH format of the V-UE. Information indicating that the PSCCH formats of the P-UE and the V-UE are different may be signaled Alternatively, an orthogonal cover code (OCC) of a PSCCH DM-RS for the P-UE may be fixed to one OCC. According to such the operation, the number of channel estimations (e.g., blinding decodings) for decoding the PSCCH may be reduced, and thus power consumption may be reduced. The transmitting terminal may randomly select one of length-3 OCCs (e.g., three OCCs), and may transmit a PSCCH DM-RS by using the selected OCC. The receiving terminal may not know the OCC selected by the transmitting terminal. Accordingly, the receiving terminal may perform a channel estimation operation for each of the length-3 OCCs, and may perform a PSCCH decoding operation based on a result thereof. When only one OCC is used, the receiving terminal may perform one channel estimation operation based on the one OCC, and may perform a PSCCH decoding operation based on a result thereof. According to such the operation, power consumption of the receiving terminal may be reduced. In the same resource pool, the V-UE may randomly select one OCC among the remaining OCCs excluding the OCC that is fixedly used for the P-UE among the OCCs, and may perform sidelink communication by using the selected OCC. According to such the operation, power consumption of the P-UE may be reduced, and interference from the V-UE may be reduced.

As another method, the terminal (e.g., receiving terminal) may perform a discontinuous reception (DRX) operation. In this case, the terminal may perform sidelink communication in an on-duration of the DRX, and may not perform sidelink communication in a period (e.g., off-duration) other than the on-duration. According to such the operation, power consumption of the terminal may be reduced. A DRX cycle may be set in consideration of physical slots including all possible slots as well as sidelink resources. Alternatively, the DRX cycle may be set in consideration of only logical slots configured for sidelink communication.

In unicast-based sidelink communication, a procedure for configuring a PC5-RRC connection between the transmitting terminal and the receiving terminal may be required. In this case, information of the DRX cycle may be exchanged between the transmitting terminal and the receiving terminal. The transmitting terminal may set the DRX cycle, and may transmit information of the DRX cycle to the receiving terminal. When the DRX cycle is identified by the transmitting terminal and the receiving terminal, sidelink communication may be performed according to the on-duration of the DRX. In this case, the terminal may operate in a sleep mode in the off-duration. Accordingly, power consumption of the terminal may be reduced. The sidelink communication according to the DRX cycle may be suitable for periodic data transmission. A periodicity of data transmission may be set according to the DRX cycle. Alternatively, the DRX cycle may be set according to the periodicity of data transmission. According to such the operation, periodic data transmission/reception operations between terminals may be efficiently performed, and power consumption of the terminals may be reduced.

However, if data transmission due to an occurrence of a specific event is required in an off-duration or aperiodic data transmission is required, sidelink communication according to the DRX cycle may not be suitable. Therefore, when data transmission is required in a period (e.g., off-duration) other than the on-duration, a method in which the transmitting terminal notifies the receiving terminal operating in a sleep mode that there is data to be transmitted may be required. When it is identified that the data exists in the transmitting terminal, the receiving terminal may perform a data reception operation even in the off-duration. In order to support the above-described operation, the transmitting terminal may transmit a wake-up signal (WUS) to the receiving terminal. The WUS may request the receiving terminal to stop the sleep mode and prepare for data reception.

The terminal operating in the sleep mode may perform a WUS monitoring operation. When a WUS is detected (e.g., when a WUS is received from the transmitting terminal), the receiving terminal may stop the sleep mode, and perform a monitoring operation of control information (e.g., SCI) for data reception. Here, the operation mode of the receiving terminal may be transitioned from the sleep mode to an awake mode. The monitoring operation of the WUS may be preferably performed so that power consumption thereof is not large. The WUS may be designed identically or similarly to a PSFCH for transmission of HARQ feedback information. A period of the PSFCH may be 1, 2, or 4 logical SL slots. The PSFCH may be repeatedly transmitted in two symbols (e.g., two OFDM symbols) in an SL slot. Among the two symbols, the first symbol may be used for automatic gain control (AGC) for correct PSFCH reception power level adjustment. The PSFCH may be transmitted using frequency resources configured by system information.

In the entire frequency region of the symbol(s) for PSFCH transmission, frequency resources other than the frequency resources used for the PSFCH transmission may be used for WUS transmission. The frequency resources for the WUS transmission (hereinafter, 'WUS frequency resources') may be configured by the base station and/or transmitting terminal. Information of the WUS frequency resources may be transmitted by using at least one of system information, RRC message (e.g., common RRC message or UE-specific RRC message), MAC CE, or control information. The WUS frequency resources may be implicitly determined by the transmitting terminal ID and/or the receiving terminal ID within a preconfigure frequency region (e.g., frequency region configured by system information, RRC message, MAC CE, and/or control information). Alternatively, in a procedure of configuring a PC5-RRC connection for unicast-based sidelink communication, the information of the WUS frequency resources may be signaled.

In sidelink communication supporting DRX operations, not only the WUS but also a go-to-sleep (GTS) signal may be used. In exemplary embodiments, the GTS signal may be referred to as a 'GTS'. The GTS signal may indicate to the receiving terminal to operate in the sleep mode even for the on-duration. When the GTS signal is detected (e.g., when the GTS signal is received from the transmitting terminal), the receiving terminal may operate in the sleep mode without waking up for the on-duration. That is, the operation mode of the receiving terminal may be maintained in the sleep mode even for the on-duration.

When a GTS signal is detected in the on-duration or when a GTS signal is detected in a data reception preparation process of a receiving terminal that has been woken up by a WUS, the receiving terminal may operate in the sleep mode again. According to such the operation, power consumption of the terminal may be further reduced. The GTS signal may be designed identically or similarly to the PSFCH. Some of the WUS frequency resources may be used for transmission of a GTS signal. The WUS and the GTS may be transmitted on the same WUS frequency resources, and in this case, different cyclic shift values may be applied to the WUS and the GTS. That is, a value of a cyclic shift applied to the WUS may be different from a value of a cyclic shift applied to the GTS. For example, a cyclic shift=0 of a Zadoff-Chu sequence having a length of 12 may be used for transmission of the WUS, and a cyclic shift=6 of the Zadoff-Chu sequence having the length of 12 may be used for transmission of the GTS. The Zadoff-Chu sequence having the length of 12 may be transmitted in specific resources (e.g., WUS frequency resources).

Figure 16A:
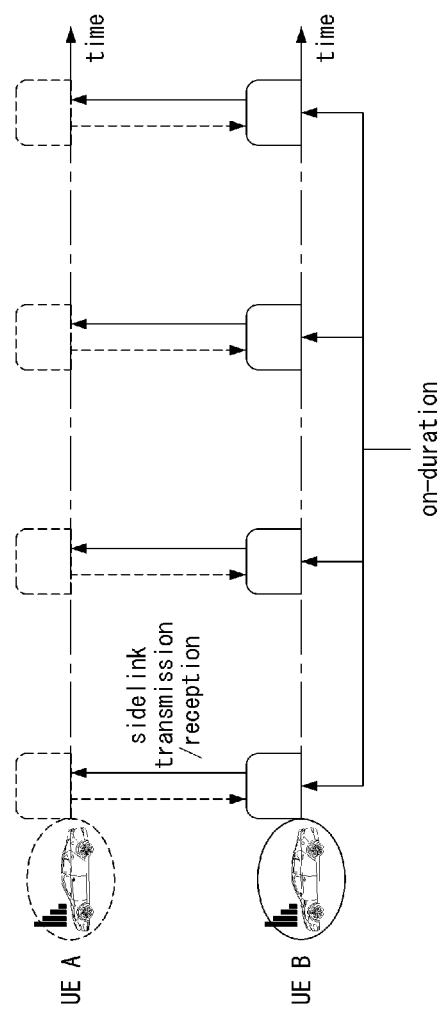
FIG. 16A is a conceptual diagram illustrating a first exemplary embodiment of a DRX operation in sidelink communication.

FIG. 16A is a conceptual diagram illustrating a first exemplary embodiment of a DRX operation in sidelink communication.

Referring to FIG. 16A, a terminal A (i.e., UE A) and a terminal B (i.e., UE B) may perform sidelink communication according to a DRX cycle.

Figure 16B:
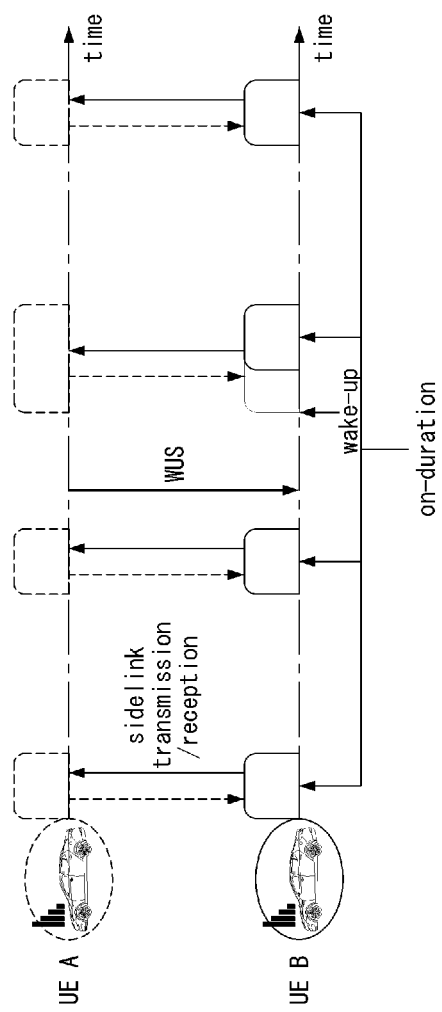
FIG. 16B is a conceptual diagram illustrating a second exemplary embodiment of a DRX operation in sidelink communication.

FIG. 16B is a conceptual diagram illustrating a second exemplary embodiment of a DRX operation in sidelink communication.

Referring to FIG. 16B, when sidelink communication is required in a period (e.g., off-duration) between an on-duration #n and an on-duration #(n+1), the terminal A (e.g., transmitting terminal) may transmit a WUS. When the WUS is detected, an operation mode of the terminal B (e.g., receiving terminal) may transition from the sleep mode to the awake mode. That is, the sleep mode of the terminal B may be stopped. The terminal B operating in the awake mode may perform a data reception preparation operation. Here, n may be a natural number.

Figure 16C:
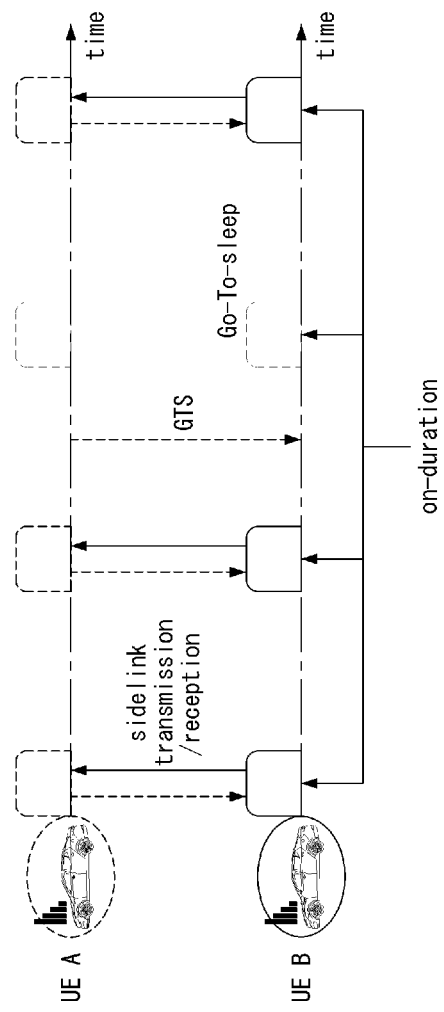
FIG. 16C is a conceptual diagram illustrating a third exemplary embodiment of a DRX operation in sidelink communication.

FIG. 16C is a conceptual diagram illustrating a third exemplary embodiment of a DRX operation in sidelink communication.

Referring to FIG. 16C, when a GTS is detected in a period (e.g., off-duration) before an on-duration or when a GTS is detected after performing sidelink communication, the terminal may operate in the sleep mode instead of the awake mode in the next on-duration. That is, the operation mode of the terminal may be maintained in the sleep mode in the next on-duration. According to such the operation, power consumption of the terminal may be further reduced.

Figure 17:
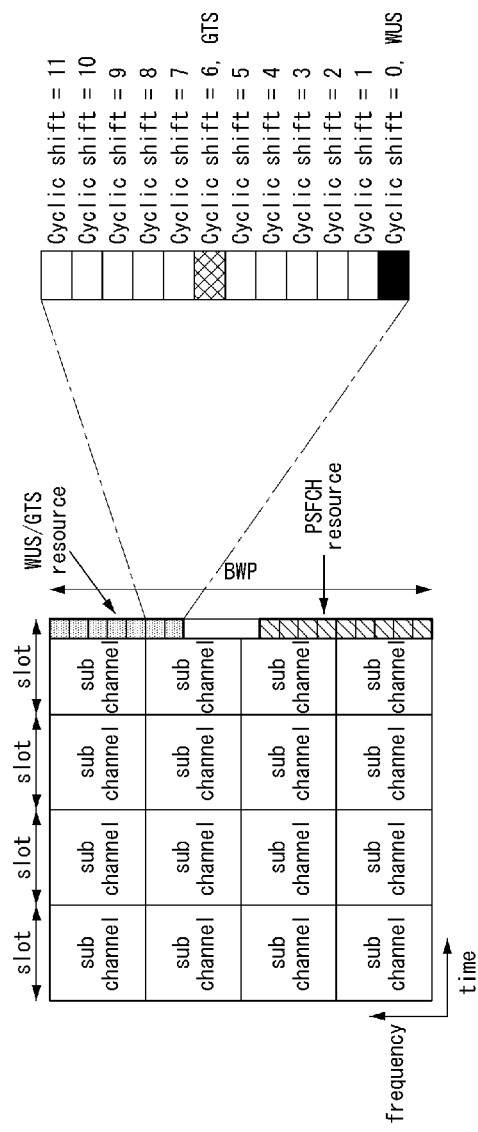
FIG. 17 is a conceptual diagram illustrating a first exemplary embodiment of transmission resources of WUS/GTS signals.

FIG. 17 is a conceptual diagram illustrating a first exemplary embodiment of transmission resources of WUS/GTS signals.

Referring to FIG. 17, a PSFCH resource (e.g., symbol in which a PSFCH is transmitted) in the time domain may be used for transmission of a WUS and/or GTS. That is, the PSFCH, WUS, and GTS may be transmitted in the same symbol(s). A transmission periodicity of each of the WUS and GTS may be set to be the same as a periodicity of the PSFCH. Frequency resources other than frequency resources for PSFCH transmission (hereinafter referred to as 'PSFCH resources') within the entire frequency region (e.g., BWP) of the corresponding symbol(s) may be used for transmission of the WUS and/or GTS. The frequency resources used for transmission of the WUS and/or GTS may be referred to as 'WUS/GTS resources'. The WUS/GTS resources may refer to the above-described WUS frequency resources.

In the exemplary embodiment shown in FIG. 17, a region of the PSFCH resource is configured as a localized region, but the PSFCH resource may be configured to be distributed within the entire frequency region (e.g., BWP). For example, resource blocks (RBs) used for the PSFCH transmission within the BWP may be indicated (or configured) by a bitmap. In addition, the WUS/GTS resources may be indicated (or configured) by the bitmap.

Without additional signaling of resource configuration, resources other than PSFCH resources may be configured as the WUS/GTS resources. The same Zadoff-Chu sequence may be used in the RB(s) or RB set(s) configured as the WUS/GTS resources, and different cyclic shift values of the same Zadoff-Chu sequence may be applied to distinguish the WUS and GTS. In the exemplary embodiment shown in FIG. 17, the WUS/GTS resources may include one RB, and a Zadoff-Chu sequence having a length of 12 may be used. In this case, a cyclic shift=0 may be applied to the WUS, and a cyclic shift=6 may be applied to the GTS.

When the WUS/GTS resources are configured as an RB set including a plurality of RBs, a sequence having a length corresponding to the RB set may be used. In this case, instead of the cyclic shifts 0 and 6, cyclic shifts having arbitrary values may be used to distinguish the WUS and GTS. When the GTS is received, the terminal may directly operate in the sleep mode without additional signaling. For example, when a HARQ response (e.g., HARQ feedback) to the data is received, the operation mode of the terminal may be transitioned from the awake mode to the sleep mode.

When DRX is configured, sidelink communication between terminals may be performed according to a DRX cycle. A terminal may transmit data (e.g., SL data) and may receive a HARQ feedback for the data on a PSFCH. In this case, a PSFCH periodicity may not coincide with the DRX cycle. Methods for solving the above-mentioned problems will be described below. The terminal supporting DRX may transmit data in an on-duration. When a reception timing of the PSFCH (e.g., HARQ feedback) for the corresponding data is outside the on-duration, the terminal may not perform a reception operation for the PSFCH. The terminal may determine that no PSFCH is received (e.g., no PSFCH or no HARQ feedback) as NACK. The terminal may perform a retransmission operation for the data related to the NACK. In addition, the terminal may report the NACK to the base station.

According to the above-described operations, unnecessary data retransmission operation may occur frequently, thereby reducing the efficiency of resource use. In order to solve such the problem, the terminal may extend the on-duration until a reception timing of the PSFCH. For example, the terminal may extend the on-duration by using a DRX inactivity timer. The terminal may not operate in the DRX mode for a time corresponding to the DRX inactivity timer. That is, the terminal may operate independently of the DRX. The terminal may receive the PSFCH for data during the extended on-duration, and then may operate in the DRX mode. That is, when the DRX inactivity timer expires, the terminal may operate in the DRX mode.

Alternatively, without using the DRX inactivity timer, the terminal may change the off-duration to an on-duration at the reception timing of the PSFCH, and may perform the PSFCH reception operation in the on-duration. When a PSFCH reception operation is not performed (e.g., no PSFCH=NACK) or when NACK is received through the PSFCH, the terminal may perform a retransmission operation on data related to the NACK. When a data retransmission timing belongs to the off-duration, the terminal may not perform the data retransmission operation in the off-duration. The terminal may perform a retransmission operation of the corresponding data at a retransmission timing within an on-duration after the off-duration. In this case, a latency of the data transmission may increase.

In order to prevent the data transmission latency, when the data retransmission timing belongs to the off-duration, the terminal may extend the on-duration until the data retransmission timing. For example, the terminal may extend the on-duration by using the DRX inactivity timer. The terminal may perform a data retransmission operation during the extended DRX on-duration, and then may operate in the DRX mode. Here, the terminal may not operate in the DRX mode for a time corresponding to the DRX inactivity timer. Alternatively, without extending the on-duration, the terminal may switch the off-duration to the on-duration at the data retransmission timing, and perform a data retransmission operation in the switched on-duration.

The above-described methods have been described with reference to the transmitting terminal, but may be applied to the receiving terminal in the same or similar manner. For example, when the transmission timing of the PSFCH is out of the on-duration, the receiving terminal may omit the PSFCH transmission operation. Alternatively, the receiving terminal may extend the on-duration until the transmission timing of the PSFCH. Alternatively, the receiving terminal may switch the off-duration to the on-duration at the transmission timing of the PSFCH.

As another example, when the retransmission timing of the data is out of the on-duration, the receiving terminal may omit the reception operation of the retransmission data. Alternatively, the receiving terminal may extend the on-duration until the retransmission timing of the data. Alternatively, the receiving terminal may switch the off-duration to the on-duration at the retransmission timing of the data.

In order to improve the efficiency of resource use and reliability in sidelink communication supporting Release-16, operations for requesting and/or acquiring channel state information between terminals may be supported. A first terminal requesting a channel state information (CSI) report may configure a delay budget to the second terminal by signaling the delay budget to a second terminal through sl-LatencyBoundCSI-Report. The first terminal may perform a CSI report monitoring operation for a time period that does not exceed the delay budget. If the time period for CSI reporting belongs to the off-duration, the corresponding CSI report may not be received. In order to solve the above-mentioned problem, the first terminal may not perform a reception operation of the CSI report. Alternatively, the first terminal may extend the on-duration until the reception timing of the CSI report. Alternatively, the first terminal may switch the off-duration to the on-duration at the reception timing of the CSI report, and the CSI report may be received in the switched on-duration.

A sidelink communication timing (e.g., transmission timing or reception timing) may overlap with an uplink transmission timing. When the sidelink transmission timing overlaps the uplink transmission timing, the terminal may simultaneously perform sidelink transmission and uplink transmission. Alternatively, the terminal may perform one transmission having a higher priority among the sidelink transmission and the uplink transmission. When a sidelink reception timing overlaps a uplink transmission timing, the terminal may perform a sidelink reception operation or an uplink transmission operation according to priorities thereof. When an on-duration and the uplink transmission timing overlap in the sidelink supporting DRX, the terminal may assume that the priority of the uplink is higher than the priority of the sidelink regardless of the actual priority of the uplink, and thus may perform the uplink transmission.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first terminal in a communication system, the operation method comprising:
    receiving, from a base station, configuration information including information of n periodicities;
    receiving information of a subset of the n periodicities from the base station;
    receiving a threshold from the base station;
    selecting one or more candidate slots in a sensing window;
    selecting one or more periodicities belonging to the subset of the n periodicities;
    performing a partial sensing operation according to the one or more periodicities based on the selected one or more candidate slots; and
    performing sidelink communication with a second terminal based on a result of the partial sensing operation,
    wherein n is a natural number equal to or greater than 2, and the partial sensing operation is not performed for at least one periodicity not belonging to the subset,
    wherein when the subset of the n periodicities is not configured, the partial sensing operation is performed by considering the n periodicities,
    wherein each of the one or more periodicities is a periodicity equal to or greater than the threshold among the n periodicities, and the partial sensing operation is not performed for at least one periodicity less than the threshold among the n periodicities.

2. The operation method according to claim 1, wherein the n periodicities are configured for each resource pool, and the configuration information is configuration information of the resource pool.

3. The operation method according to claim 1, wherein the configuration information is received from the base station through system information or a radio resource control (RRC) message.

4. The operation method according to claim 1, wherein a priority of a resource determined by the partial sensing operation is set to be higher than a priority of a resource determined by a full sensing operation.

5. The operation method according to claim 1, further comprising transmitting information indicating that a resource determined by the partial sensing operation is used by the first terminal.

6. A first terminal in a communication system, the first terminal comprising:
    a processor;
    a memory electronically communicating with the processor; and
    instructions stored in the memory,
    wherein when executed by the processor, the instructions cause the first terminal to:
        receive, from a base station, configuration information including information of n periodicities;
        receive information of a subset of the n periodicities from the base station;
        receive a threshold from the base station;
        select one or more candidate slots in a sensing window;
        select one or more periodicities belonging to the subset of the n periodicities;
        perform a partial sensing operation according to the one or more periodicities based on the selected one or more candidate slots; and
        perform sidelink communication with a second terminal based on a result of the partial sensing operation,
    wherein n is a natural number equal to or greater than 2, and the partial sensing operation is not performed for at least one periodicity not belonging to the subset,
    wherein when the subset of the n periodicities is not configured, the partial sensing operation is performed by considering the n periodicities,
    wherein each of the one or more periodicities is a periodicity equal to or greater than the threshold among the n periodicities, and the partial sensing operation is not performed for at least one periodicity less than the threshold among the n periodicities.

7. The first terminal according to claim 6, wherein a priority of a resource determined by the partial sensing operation is set to be higher than a priority of a resource determined by a full sensing operation.

* * * * *